United States Patent [19]

Tanaka et al.

[11] Patent Number: 5,576,890
[45] Date of Patent: Nov. 19, 1996

[54] ZOOM LENS

[75] Inventors: Tsunefumi Tanaka, Kanagawa-ken; Hideki Ogawa, Tokyo; Hiroshi Endo, Kanagawa-ken, all of Japan

[73] Assignee: Canon Kabushiki Kaisha, Tokyo, Japan

[21] Appl. No.: 440,980

[22] Filed: May 15, 1995

Related U.S. Application Data

[63] Continuation of Ser. No. 22,156, Feb. 23, 1993, abandoned.

[30] Foreign Application Priority Data

Feb. 28, 1992 [JP] Japan .................................. 4-078433
May 11, 1992 [JP] Japan .................................. 4-144746

[51] Int. Cl.$^6$ .................................................. G02B 15/14
[52] U.S. Cl. ......................................................... 359/686
[58] Field of Search .............................................. 359/686

[56] References Cited

U.S. PATENT DOCUMENTS

| | | | |
|---|---|---|---|
| 4,516,839 | 5/1985 | Tokumaru | 359/686 |
| 4,687,302 | 8/1987 | Ikemori et al. | 359/686 |
| 4,776,680 | 10/1988 | Tanaka . | |
| 4,846,562 | 7/1989 | Tokumaru et al. | 359/686 |
| 4,852,984 | 8/1989 | Takahashi et al. . | |
| 4,871,243 | 10/1989 | Ogawa et al. . | |
| 4,896,950 | 1/1990 | Endo et al. . | |
| 5,042,927 | 8/1991 | Ogawa et al. . | |
| 5,078,481 | 1/1992 | Nakayama et al. | 359/686 |
| 5,132,848 | 7/1992 | Nishio et al. | 359/686 |
| 5,189,557 | 2/1993 | Endo . | |
| 5,264,965 | 11/1993 | Hirakawa | 359/686 |
| 5,276,553 | 1/1994 | Tatsuno | 359/686 |

FOREIGN PATENT DOCUMENTS

| | | |
|---|---|---|
| 49-23912 | 6/1974 | Japan . |
| 53-34539 | 3/1978 | Japan . |
| 54-14403 | 4/1980 | Japan . |
| 57-163213 | 10/1982 | Japan . |
| 58-4113 | 1/1983 | Japan . |
| 63-241511 | 10/1988 | Japan . |
| 1193709 | 8/1989 | Japan . |
| 2201310 | 8/1990 | Japan . |

*Primary Examiner*—James Larson
*Attorney, Agent, or Firm*—Fitzpatrick, Cella, Harper & Scinto

[57] ABSTRACT

A zoom lens is disclosed comprising, from front to rear, a first lens unit of negative refractive power, a second lens unit of positive refractive power, a third lens unit of negative refractive power and a fourth lens unit of positive refractive power, zooming from a wide-angle end to a telephoto end being performed by moving at least the first, second and fourth lens units in such a way that an air separation between the first and second lens units decreases, an air separation between the second and third lens units increases and an air separation between the third and fourth lens units decreases, wherein the form and the construction and arrangement of the members of the lens units and, if an aspheric surface is in use, its shape, are appropriately determined.

4 Claims, 23 Drawing Sheets

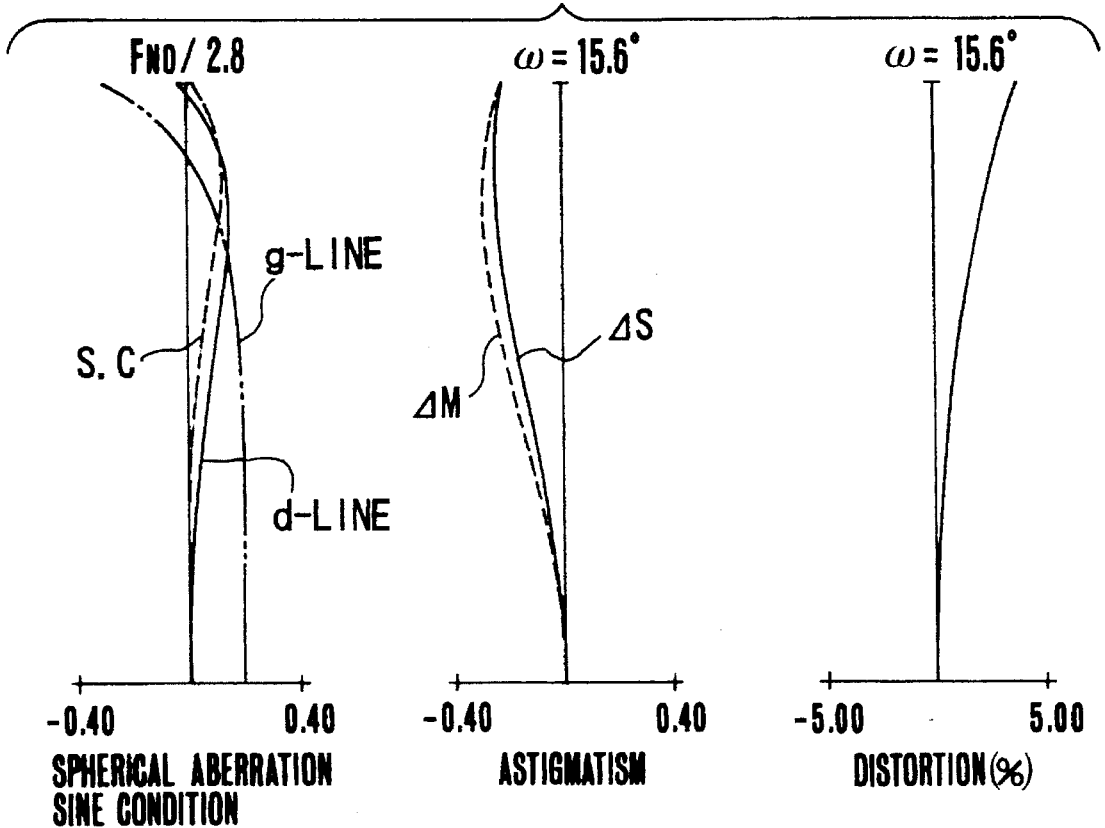

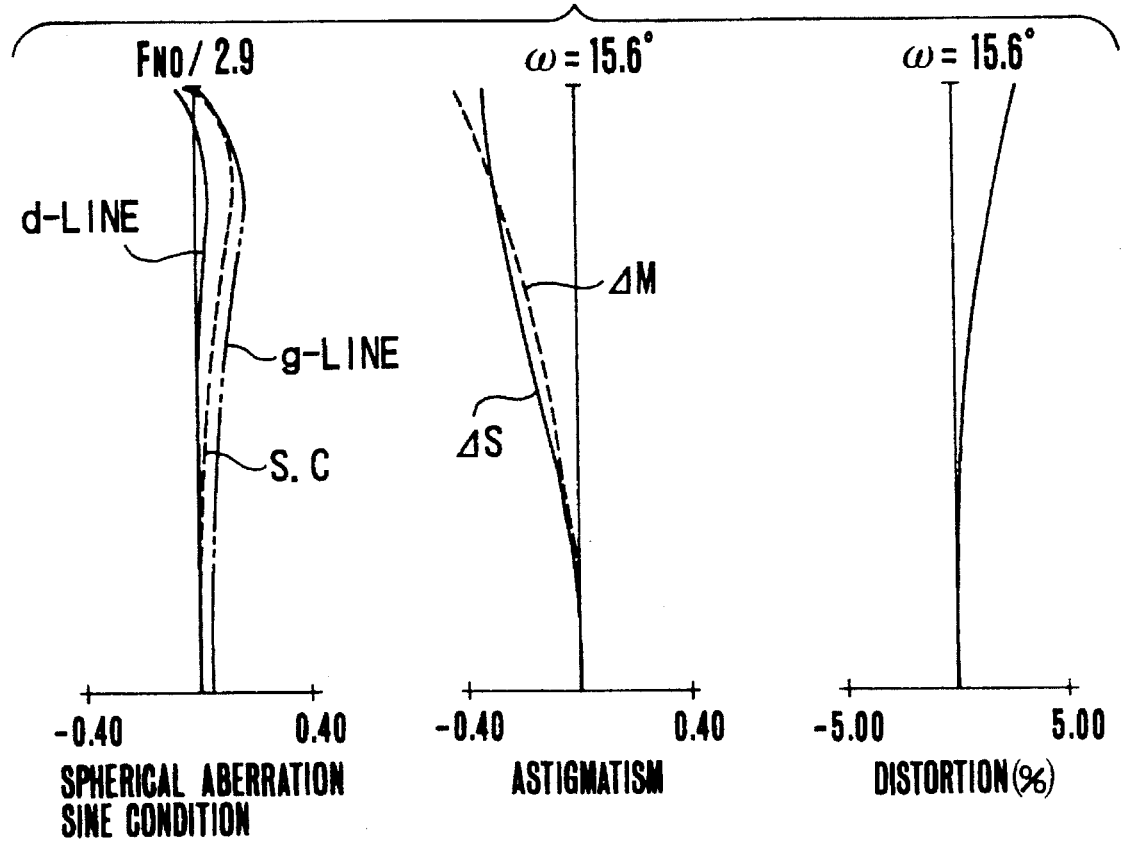

ZOOM LENS

This application is a continuation of application Ser. No. 08/022,156, filed Feb. 23, 1993, abandoned.

BACKGROUND OF THE INVENTION

1. Field of the Invention

This invention relates to zoom lenses suited to single-lens reflex cameras or video cameras and, more particularly, to zoom lenses of relatively wide angle, high range and large relative aperture of the type in which the front lens unit is negative in power, or the so-called "negative lead" type, having four or five lens units in total. Herein, the term "unit" is equivalent to "group".

2. Description of the Related Art

The negative lead type of zoom lens, because of the lens unit of negative refractive power coming first in arrangement, is easier to increase the maximum image angle and amenable to shorten the minimum possible object distance for close-up photography. With these merits on one hand, there are, on the other hand, drawbacks that the diameter of the stop is caused to increase and that the range of variation of the image magnification becomes difficult to increase.

To overcome these drawbacks, there have been made previous proposals for minimization of the bulk and size of the entirety of the lens system in combination with a great increase of the range, as in, for example, Japanese Patent Publications Nos. Sho 49-23912 and Sho 55-14403 and Japanese Laid-Open Patent Applications Nos. Sho 53-34539, Sho 57-163213, Sho 58-4113, Sho 63-241511, Hei 1-193709 and Hei 2-201310.

In each of these publications, the zoom lens is made to comprise four lens units of minus-plus-minus-plus power arrangement in this order from the object side as a whole, of which certain ones are moved in appropriate relation to vary the focal length.

Recently, for the single-lens reflex camera or video camera, the public is demanding a zoom lens which includes wide image angles and has a high zoom ratio as the standard equipment. For example, the market has already sold single-lens reflex cameras of 35 mm format having zoom lenses of as wide a maximum image angle as 35 mm or 28 mm in focal length with the telephoto end at 70 mm each as the standard equipment.

More recently, there is demanded a zoom lens having an extended range toward the telephoto end with the result of from 28 mm to 80 mm or to 85 mm in focal length and a large relative aperture.

As the field of view increases to so wide an angle and the range, too, extends to so long a focal length, however, it becomes necessary in general to admit an unduly large increase of the physical length of the zoom lens and moreover to make elaborate the relation in which the lens units move to effect zooming. This leads to a multi-sleeve construction of the lens mounting. Thus, a problem arises in that the lens barrel increases largely in bulk and size and its mounting mechanism comes to a very complicated structure.

SUMMARY OF THE INVENTION

According to the present invention, four lens units are used for constructing a complete zoom lens and appropriate conditions are defined for the refractive powers of the lens units and for the relation of movement of the lens units for zooming. Thus, the physical length of the lens is shortened and the lens mounting is prevented from increasing in size and from becoming complicated in structure. It is, therefore, an object of the invention to provide a zoom lens of relatively wide image angles having a high range, while still maintaining high optical performance throughout the entire zooming range.

A specific zoom lens of the invention has as large a relative aperture as 2.8 or thereabout in F-number, is nonetheless wide in angular field coverage, and has as high a range as approximately 2 to 3, and its optical performance is maintained stable at a high level throughout the entire zooming range.

Besides these features, in the present invention, the focusing provision is made not in the first lens unit but in any other, or the inner focus type is employed to make it easy to perform the focusing operation. Therefore, another object of the invention is to provide a wide angle zoom lens suited to be used in, for example, auto-focus cameras.

According to the invention, in a preferred embodiment thereof, a zoom lens comprises, from front to rear, a first lens unit of negative refractive power, a second lens unit of positive refractive power, a third lens unit of negative refractive power and a fourth lens unit of positive refractive power, zooming from the wide-angle end to the telephoto end being performed by moving at least the first, second and fourth lens units in such a way that the air separation between the first and second lens units decreases, the air separation between the second and third lens units increases and the air separation between the third and fourth lens units decreases. Given this arrangement, the members in each lens unit and, if an aspheric surface is used, an equation for its shape, are properly figured.

With this zoom lens, further improvements are attained by dividing such a first lens unit into two parts of negative refractive powers which, when zooming, are made to move in respective different loci from each other.

In this regard, another embodiment is disclosed where of these divided parts, the rear negative one is used for focusing purposes.

These and other objects and features of the invention will become apparent from the following detailed description of preferred embodiments thereof with reference to the accompanying drawings.

BRIEF DESCRIPTION OF THE DRAWINGS

FIGS. 18(A), 18(B) and 18(C) are graphic representations of the various aberrations of the numerical example 9 of the invention in the wide-angle end, an intermediate position and the telephoto end, respectively.

FIGS. 24(A), 24(B) and 24(C) are graphic representations of the various aberrations of the numerical example 12 of the invention in the wide-angle end, an intermediate position and the telephoto end, respectively.

In these figures, S stands for the sagittal image surface, M for the meridional image surface, d for the spectral d-line, g for the spectral g-line, and SC for the sine condition.

DETAILED DESCRIPTION OF THE PREFERRED EMBODIMENTS

FIG. 1 to FIG. 9 in block diagrams show the numerical examples 1 to 9 of the invention, respectively. In these lens block diagrams, L1 denotes a first lens unit of negative refractive power, L2 a second lens unit of positive refractive power, L3 is a third lens unit of negative refractive power, and L4 is a fourth lens unit of positive refractive power. SP represents a stop.

In the invention, all the air separations between the lens units are made variable. In this respect, certain ones of the lens units are chosen to move for zooming purposes.

In particular, at least the first, second and fourth lens units are moved in such a way that, as zooming goes from the wide-angle end to the telephoto end, the air separation between the first and second lens units decreases, the air separation between the second and third lens units increases, and the air separation between the third and fourth lens units decreases. More specifically speaking, zooming from the wide-angle end to the telephoto end is performed by moving the first lens unit toward the image side, the second lens unit toward the object side and the fourth lens unit toward the object side.

In the second and fourth lens units, their forward movements may be made either independent of each other, or in unison with each other. In the latter case, simplification of the structure of the lens mounting is facilitated. Focusing is performed by moving the whole first lens unit. Besides this, as the first lens unit is divided into two lens sub-units, or a front lens sub-unit and a rear lens sub-unit, this rear lens sub-unit may otherwise be moved for focusing.

Next, the features of each of the numerical examples shown in FIG. 1 to FIG. 9 are described in order.

Figure 1:
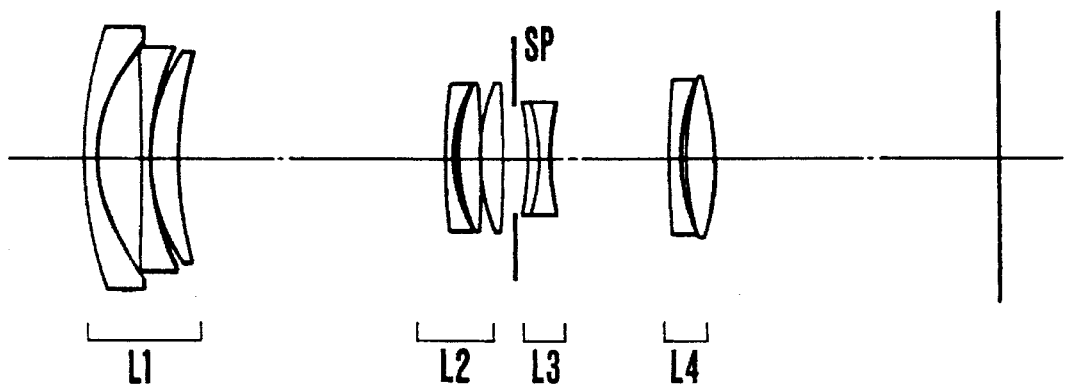
FIG. 1 is a longitudinal section view of a numerical example 1 of a zoom lens of the invention.
Figure 2:
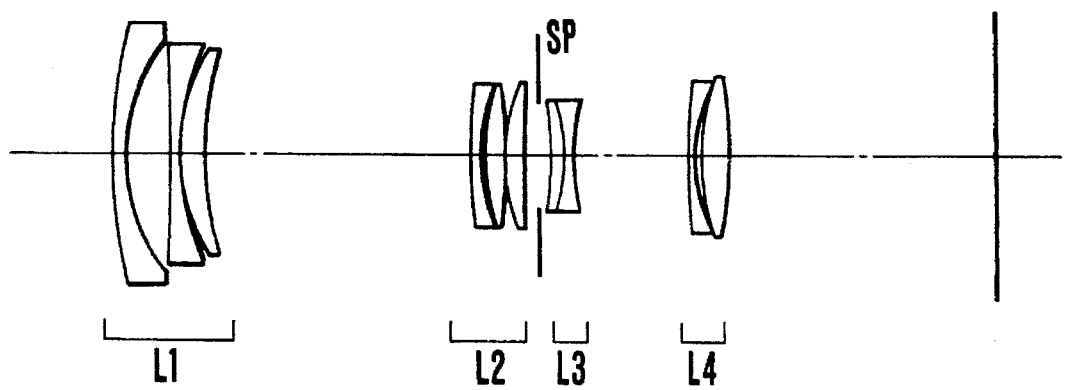
FIG. 2 is a longitudinal section view of a numerical example 2 of a zoom lens of the invention.
Figure 3:
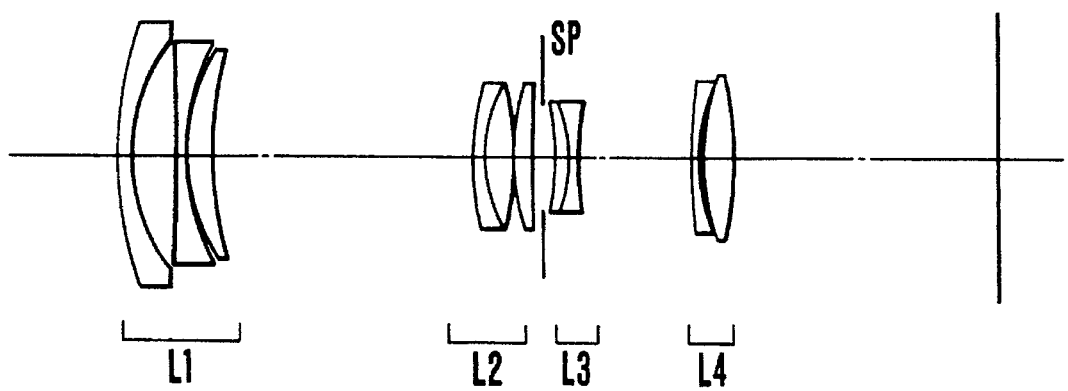
FIG. 3 is a longitudinal section view of a numerical example 3 of a zoom lens of the invention.

(i) In the numerical examples 1, 2 and 3 shown in FIGS. 1, 2 and 3, zooming from the wide-angle end to the telephoto end is performed by moving at least the first, second and fourth lens units in such a way that the air separation between the first and second lens units decreases, the air separation between the second and third lens units increases and the air separation between the third and fourth lens units decreases. The third lens unit is constructed from two separate lenses including a positive lens and negative lens, or from a cemented lens composed thereof, and the fourth lens unit is constructed from two separate lenses including a negative lens and a positive lens, or from a cemented lens composed thereof. Thus, the entire lens system gets a shorter total length than was heretofore possible, while still permitting a high optical performance to be obtained at the wide-angle end and moreover maintaining good stability of the aberrations throughout the entire zooming range.

The second lens unit is constructed as comprising, from front to rear, a negative lens of meniscus shape having a strong negative refracting surface facing the image side, a positive lens and a positive lens having a convex surface facing the object side. Thus, the second lens unit, though given a relatively strong positive refractive power, is well corrected for aberrations. Particularly on the telephoto side, the diameter of the light bundle emerging from the second lens unit is made smaller in order to insure that the diameter of the diaphragm aperture is shortened. Thus, the diameter of the outer barrel of the lens mounting is minimized.

The first lens unit is constructed from, front to rear, a negative lens of meniscus shape having a concave surface facing the image side, a negative lens and a positive lens of meniscus shape having a convex surface facing the object side. Commonly, a positive lens would be arranged at the frontmost position. In this case, distortion on the wide-angle side could be corrected well. However, the outer diameter of the first lens unit would be caused to increase largely.

According to the invention, therefore, the negative lens takes the frontmost position as described above in the construction of the first lens unit. So, the distortion is corrected by using the other lens units. Thus, the outer diameter of the first lens unit is minimized. In addition, for close-up photography, the possible minimum object distance is made sure to shorten.

The third lens unit is made stationary during zooming, thus contributing to a reduction of the complexity of structure of the mounting mechanism for the lens system. Further, the second and fourth lens units may move forward in unison with each other to vary the focal length from the wide-angle end to the telephoto end, so that a further reduction of the complexity of structure of the lens mounting mechanism can be achieved.

For the focal lengths F2 and F3 of the second and third lens units, respectively, the following relationship is set forth:

$$F2 < |F3| \quad (1\text{-}a)$$

The use of the strong positive refractive power in the second lens unit assists in minimizing the diameter of the diaphragm aperture. Likewise as described above, this leads to a minimization of the diameter of the lens barrel. The third lens unit is, on the other hand, relatively weak in refractive power as compared with the second lens unit. This leads to a possibility of effectively correcting aberrations, though the third lens unit is constructed from only two lens elements.

For the focal length F4 of the fourth lens unit, the following relationship is set forth:

$$0.5 < F4/FT < 2 \quad (1\text{-}b)$$

where FT is the focal length of the entire lens system at the telephoto end. This concerns good correction of aberrations with the limitation of the bulk and size of the entire lens system to a minimum.

When the refractive power of the fourth lens unit is too strong as exceeding the lower limit of the condition (1–b), the negative and positive lenses, or the two lens elements, become insufficient in number for the fourth lens unit to carry out good correction of aberrations. When the refractive power of the fourth lens unit is too weak as exceeding the upper limit, the total zooming movement of each of the lens units increases to increase the total length of the entire lens system objectionably.

Figure 4:
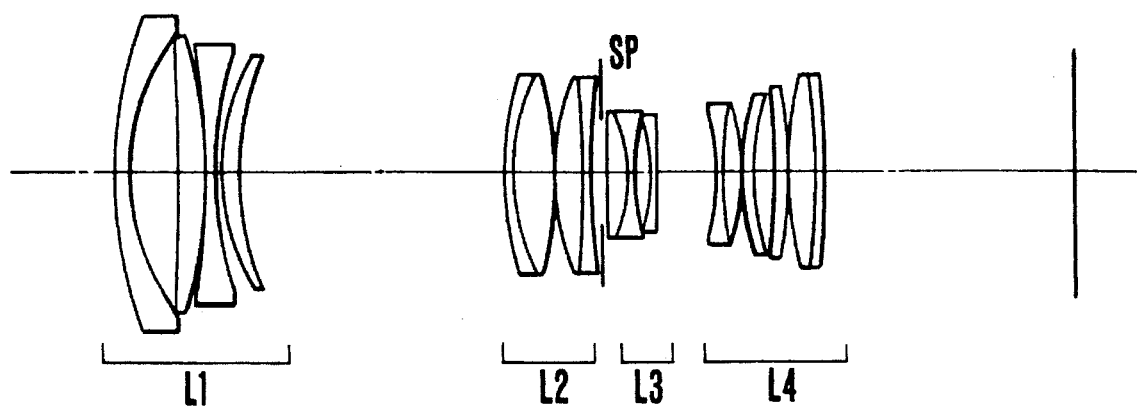
FIG. 4 is a longitudinal section view of a numerical example 4 of a zoom lens of the invention.
Figure 5:
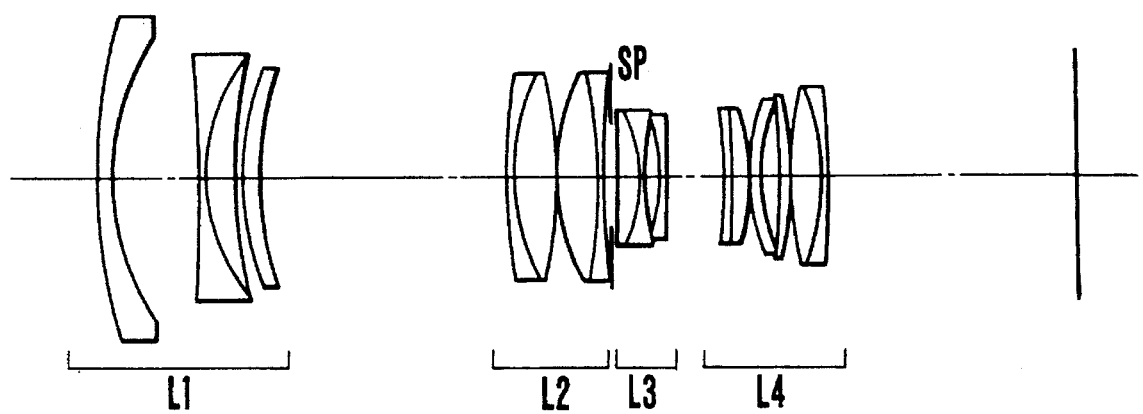
FIG. 5 is a longitudinal section view of a numerical example 5 of a zoom lens of the invention.

(ii) In the numerical examples 4 and 5 shown in FIGS. 4 and 5, all the air separations between the lens units are varied to effect zooming. The second lens unit comprises a cemented lens composed of a negative first lens of meniscus shape having a convex surface facing the object side and a positive second lens whose surfaces both are convex, and a positive third lens having a strong positive refracting surface facing the object side. The front surface of the first or third lens is formed to aspheric shape. For the radius of curvature R2,2 of the cemented surface of the aforesaid cemented lens and the aspheric coefficients B and C of the aforesaid aspheric surface, the following conditions are set forth:

$$0.6 < R2,2/F2 < 1.0 \quad (2\text{-}a)$$

$$B < 0 \quad (2\text{-}b)$$

$$B + C \times (DE/2)^2 < 0 \quad (2\text{-}c)$$

where F2 is the focal length of the second lens unit, and DE is the outer diameter of the third lens. When these conditions are satisfied, the entire lens system has its total length shortened, and the various aberrations are well corrected for a high optical performance throughout the entire zooming range.

In the present embodiment, from the first lens unit of negative refractive power, a diverging light beam emerges and enters the second lens unit. For this reason, as the F-number becomes faster, the light beam is incident on the second lens unit at a higher position from the optical axis. As a result, the marginal zone of the second lens unit produces very large aberrations, thus lowering the optical performance.

As the countermeasure to this, mention may be made of the methods of increasing the number of lens elements in the second lens unit, and of using a weakened refractive power in the second lens unit. These methods are, however, not favorable, because the total length of the complete lens becomes long and the outer diameter of the first lens unit is increased.

Therefore, in the present embodiment, the second lens unit which would otherwise produce various aberrations of large magnitude, particularly spherical and comatic ones, is well corrected by the three lenses which satisfy the above-cited conditions (2–a), (2–b) and (2–c) and the aspheric surface. Thus, a high optical performance is obtained.

The inequalities of condition (2–a) have an aim chiefly to correct coma. When the lower limit of condition (2–a) is exceeded, over-correction of coma results. Conversely when the upper limit is exceeded, it becomes difficult to correct the residual coma by using the other surfaces, and to do good correction of it together with spherical aberration and astigmatism. Further, it becomes difficult to correct all aberrations of the entire lens system in good balance.

The inequalities of conditions (2–b) and (2–c) have an aim to determine an appropriate aspheric shape to well correct, in particular, spherical aberration and coma. Of these, the factor in the condition (2–b) represents the aberration component of third order. This is taken negative. That is, the positive refractive power gets weaker in the marginal zone. By this function, the spherical aberration and coma are shifted in the over-correcting direction. In combination with the condition (2–a), therefore, good correction of spherical aberration and coma is attained.

The inequality of condition (2–c) takes into account the aberration components of up to 5th orders when the appropriate aspheric shape is determined. So, the aspheric amount at the position of the outer diameter DE of the lens is determined so as to weaken the refractive power in the marginal zone. Thus, the various aberrations produced are reduced, although the relatively strong positive refractive power is laid on the second lens unit. This gives rise to an additional advantage that the first lens unit can take a strong negative refractive power so that a shortening of the total length of the complete lens is achieved.

Besides these, the numerical example 5 has its first lens unit to include at least two negative lenses and positive lenses. By this, astigmatism and distortion are effectively corrected.

The first lens unit comprises, from the object side, a front lens sub-unit and a rear lens sub-unit, totaling two lens sub-units, of which the rear lens sub-unit is made axially movable for focusing. During the focusing operation, therefore, the total length of the complete lens remains constant. Since the lens does not protrude forward, and the rear lens sub-unit that is used for focusing is relatively small in size and light in weight, when in application to, for example, the automatic focusing camera, the drive control becomes easy to do.

Figure 6:
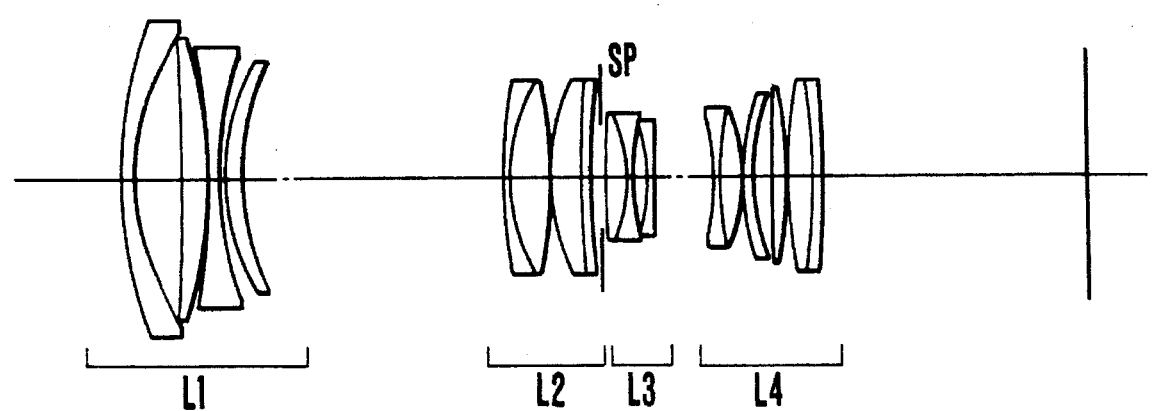
FIG. 6 is a longitudinal section view of a numerical example 6 of a zoom lens of the invention.
Figure 7:
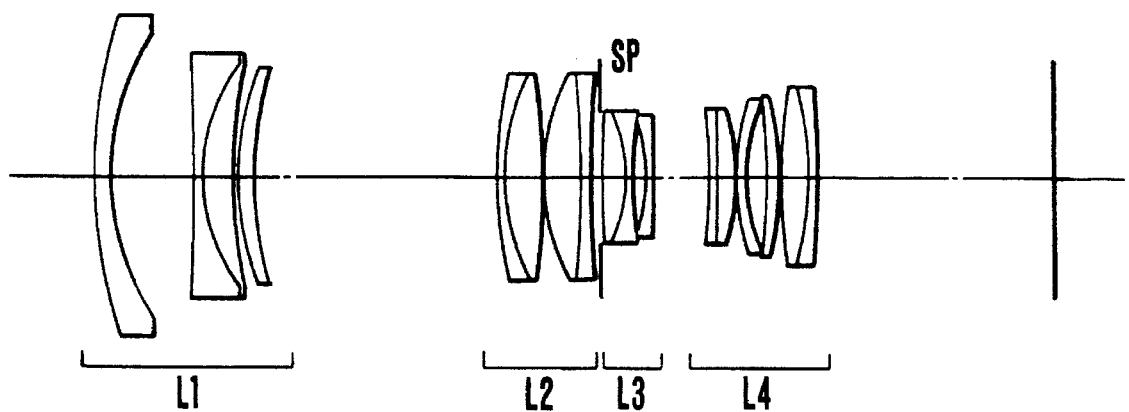
FIG. 7 is a longitudinal section view of a numerical example 7 of a zoom lens of the invention.

(iii) In the numerical examples 6 and 7 shown in FIGS. 6 and 7, all the air separations between the lens units are varied when zooming. The second lens unit includes a cemented lens composed of a negative first lens of meniscus shape having a convex surface facing the object side and a positive second lens whose surfaces both are convex, and a positive third lens having a strong positive refracting surface facing the object side. The rear surface of the second or third lens is formed to aspheric shape. For the radius of curvature R2,2 of the cemented surface of the aforesaid cemented lens and the aspheric coefficients B and C of the aforesaid aspheric surface, the following conditions are set forth:

$$0.6 < R2,2/F2 < 1.0 \qquad (3-a)$$

$$B > 0 \qquad (3-b)$$

$$B + C \times (DE/2)^2 > 0 \qquad (3-c)$$

where F2 is the focal length of the second lens unit and DE is the outer diameter of the third lens. When these conditions are satisfied, similar results to those of the numerical examples 4 and 5 described before are effected. That is, while a shortening of the total length of the entire lens system is achieved, all aberrations with zooming are well corrected, so that a high optical performance is obtained throughout the entire zooming range.

In the present embodiment, from the first lens unit of negative refractive power to the second lens unit, the emerging light beam is diverging. For this reason, the faster the F-number, the higher the height of incidence on the second lens unit from the optical axis. This results in production of very large aberrations in the marginal zone of the second lens unit, which lowers the optical performance.

To prevent this, the number of lens elements in the second lens unit may be increased, or the refractive power of the second lens unit may be weakened. These methods are, however, associated with drawbacks of elongating the total length of the entire lens system and of increasing the outer diameter of the first lens unit.

In the present embodiment, therefore, the second lens unit whose various aberrations, particularly spherical aberration and coma, would otherwise increase largely is well corrected by the three lenses which satisfy the above-cited conditions (3–a), (3–b) and (3–c) and the aspheric surface. Thus, a high optical performance is obtained.

The inequalities of condition (3–a) have an aim chiefly to correct coma. When the lower limit of the condition (3–a) is exceeded, over-correction of coma results. Conversely when the upper limit is exceeded, it becomes difficult to correct the residual coma by using any other surfaces and to do good correction of it together with spherical aberration and astigmatism. Further, it also becomes difficult to correct all aberrations of the entire lens system in good balance.

The inequalities of conditions (3–b) and (3–c) give the aspheric surface an appropriate shape to well correct, in particular, spherical aberration and coma. Of these, the condition (3–b) gives negative sign to the aberration component of third order, in other words, produces a function of weakening the positive refractive power in the marginal zone. Thus, the spherical aberration and coma are overcorrected. In combination with the condition (3–a), therefore, good correction of spherical aberration and coma results.

The inequality of condition (3–c) brings the aberration components of up to fifth orders in determining an appropriate shape of the aspheric surface to control the aspheric amount particular at the position of the outer diameter DE of the lens so that the refractive power is weakened in the marginal zone. Despite the second lens unit having its positive refractive power made relatively strong, therefore, the various aberrations are reduced. This also allows the first lens unit to be given a strong negative refractive power with an advantage of achieving a shortening of the total length of the complete lens.

Besides these, the numerical example 7 has another feature that, similarly to the numerical examples 4 and 5 described before, the first lens unit includes at least two negative lenses and a positive lens. By this, astigmatism and distortion are corrected well.

Again, the first lens unit comprises, from the object side, a front lens sub-unit and a rear lens sub-unit, totaling two lens sub-units, of which the rear lens sub-unit is made axially movable for focusing. Thus, the total length of the complete lens remains constant during focusing. So, the lens does not protrude outward. Again, because the rear lens sub-unit to move is relatively small in size and light in weight, the driving control in, for example, automatic focus mode is made quick and easy.

Figure 8:
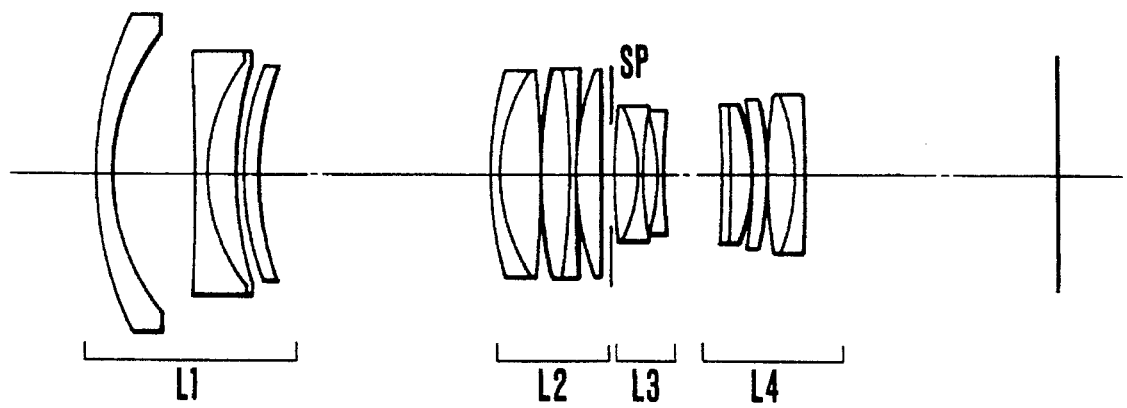
FIG. 8 is a longitudinal section view of a numerical example 8 of a zoom lens of the invention.
Figure 9:
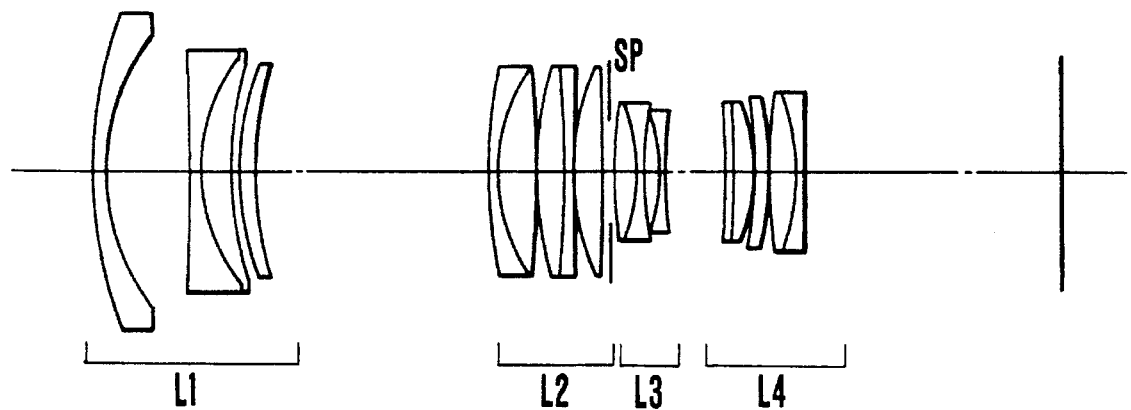
FIG. 9 is a longitudinal section view of a numerical example 9 of a zoom lens of the invention.
Figure 10A:
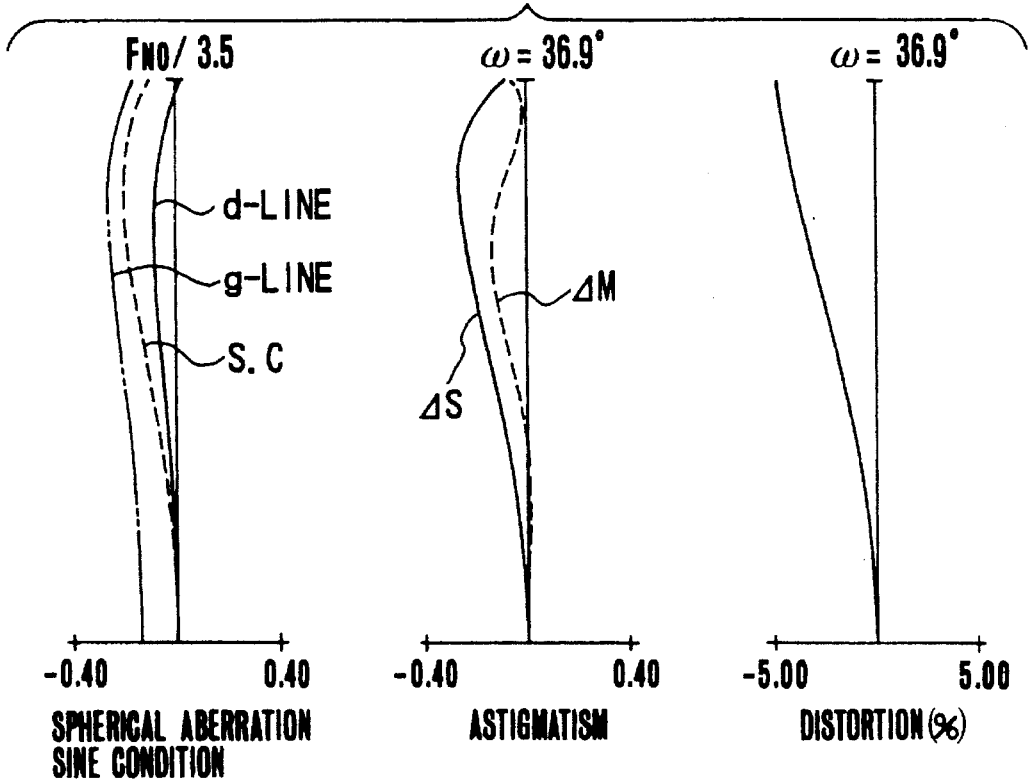
FIGS. 10(A), 10(B) and 10(C) are graphic representations of the various aberrations of the numerical example 1 of the invention in the wide-angle end, an intermediate position and the telephoto end, respectively.
Figure 10B:
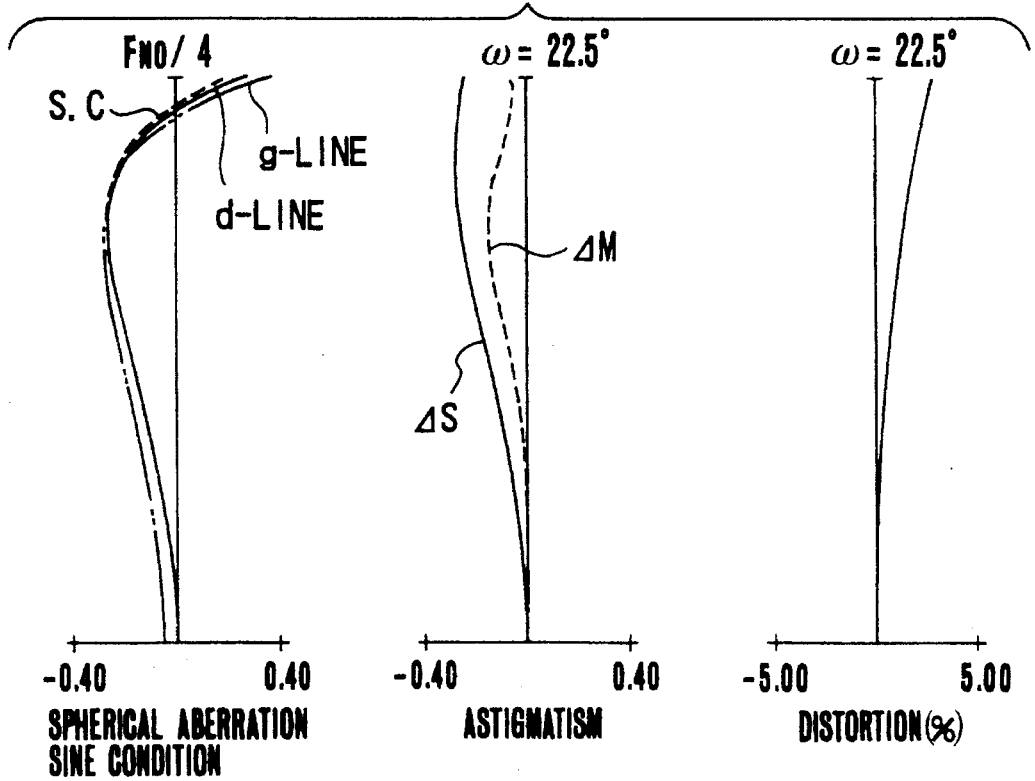
Figure 10C:
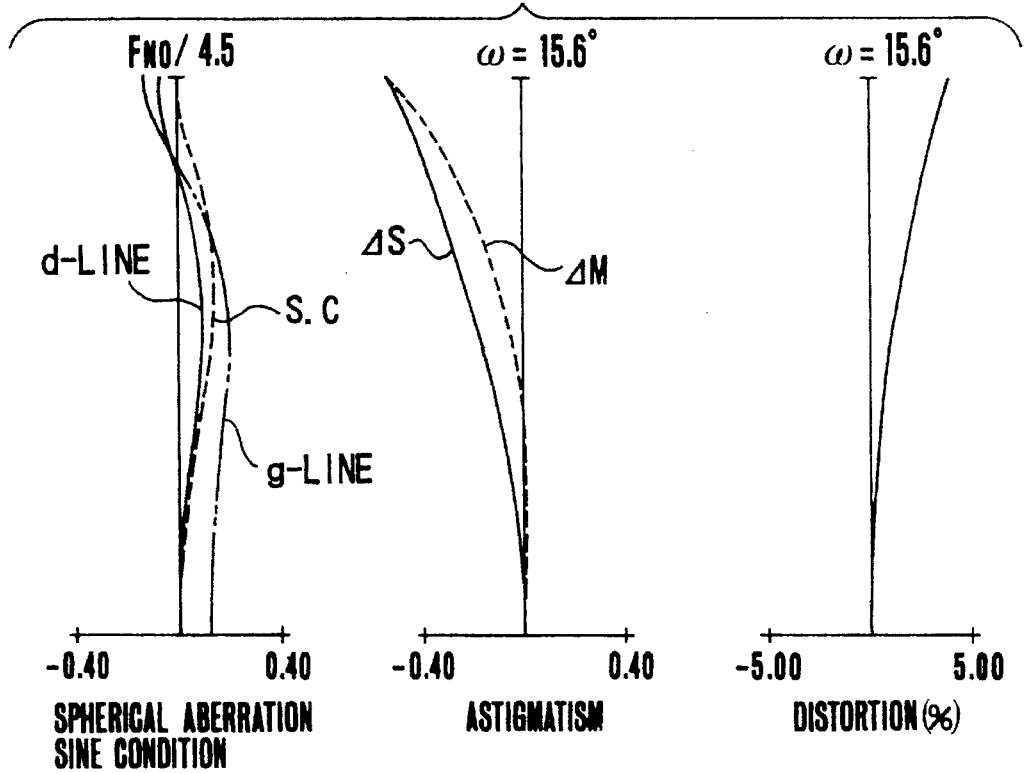
Figure 11A:
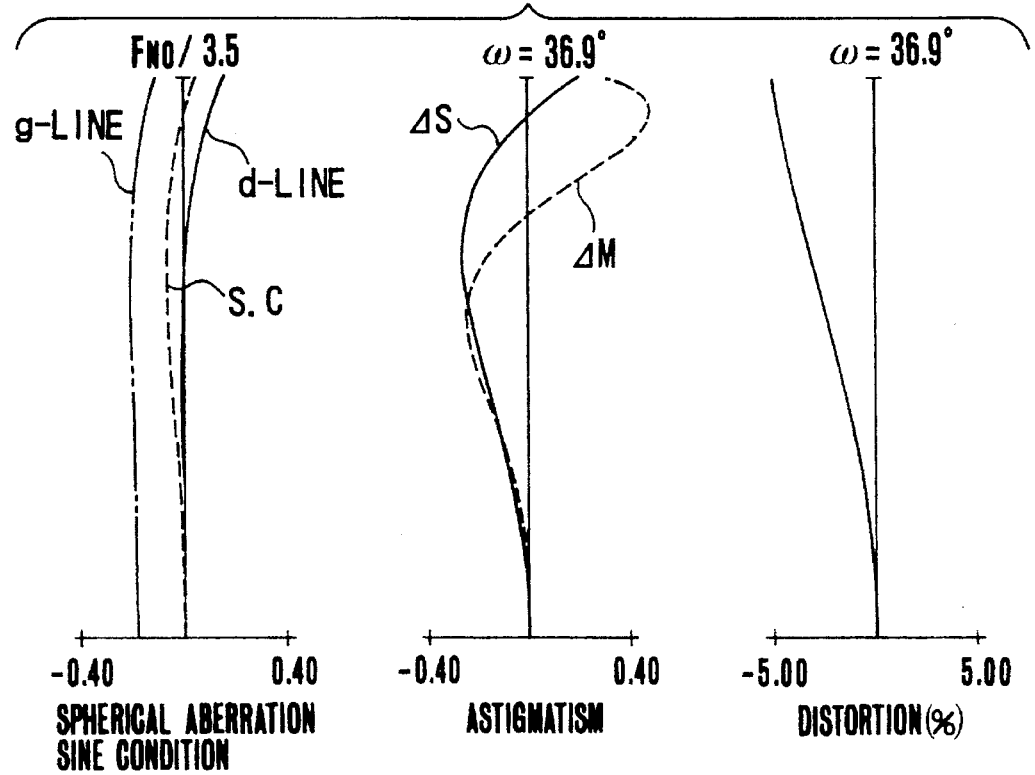
FIGS. 11(A), 11(B) and 11(C) are graphic representations of the various aberrations of the numerical example 2 of the invention in the wide-angle end, an intermediate position and the telephoto end, respectively.
Figure 11B:
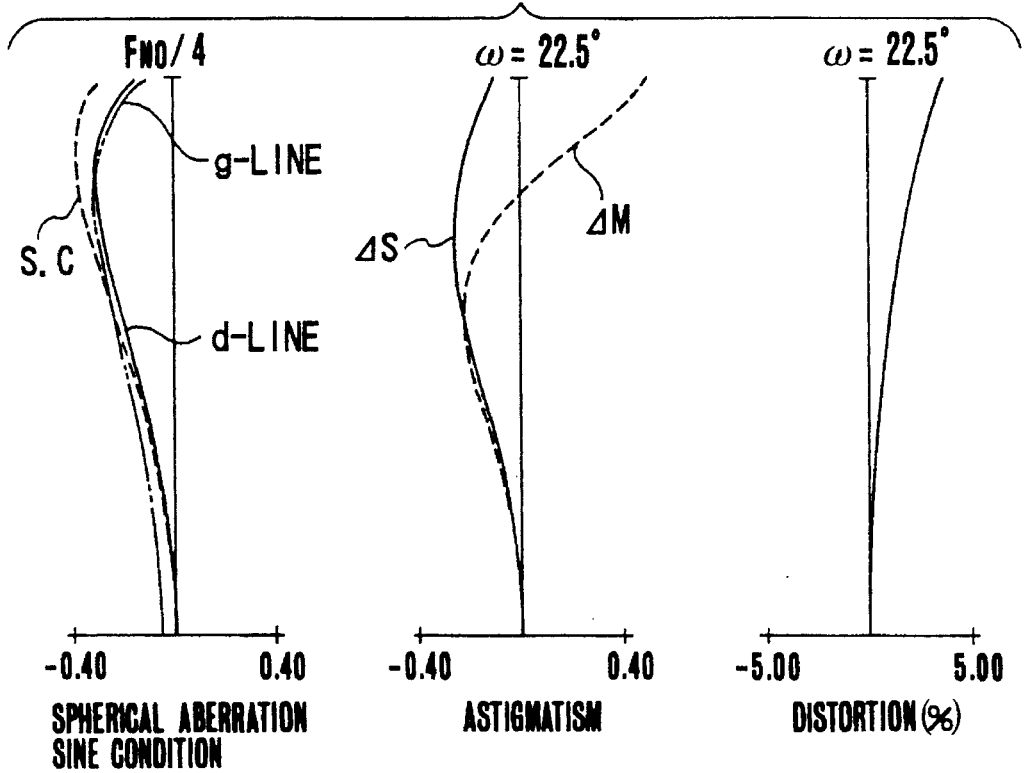
Figure 11C:
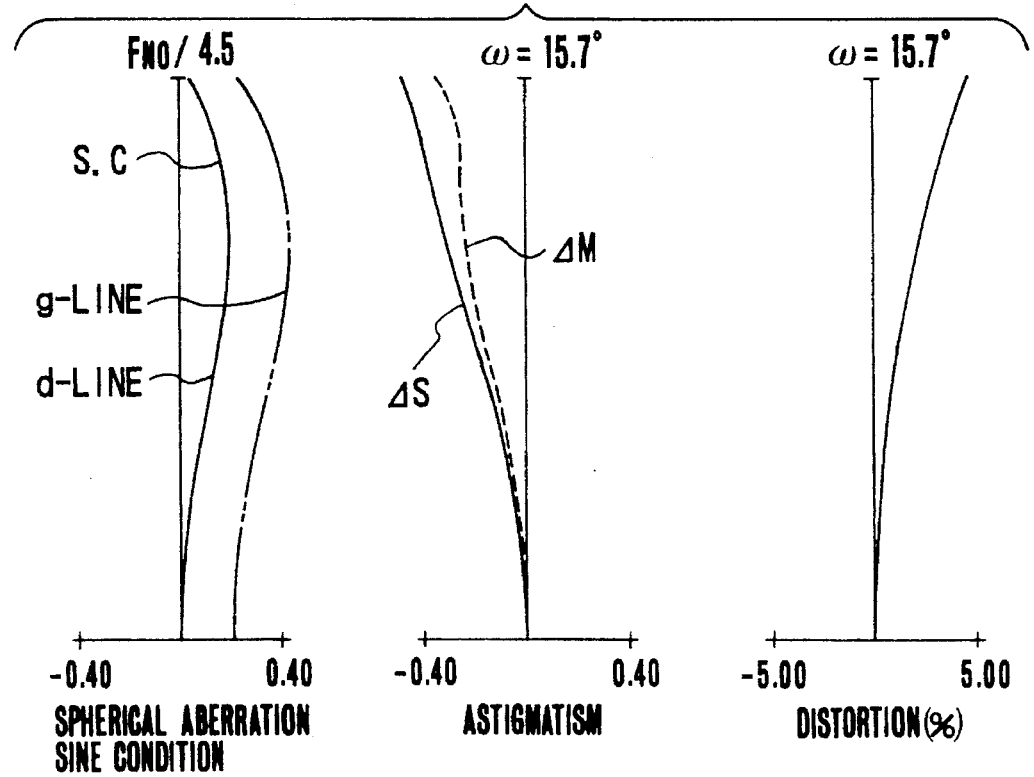
Figure 12A:
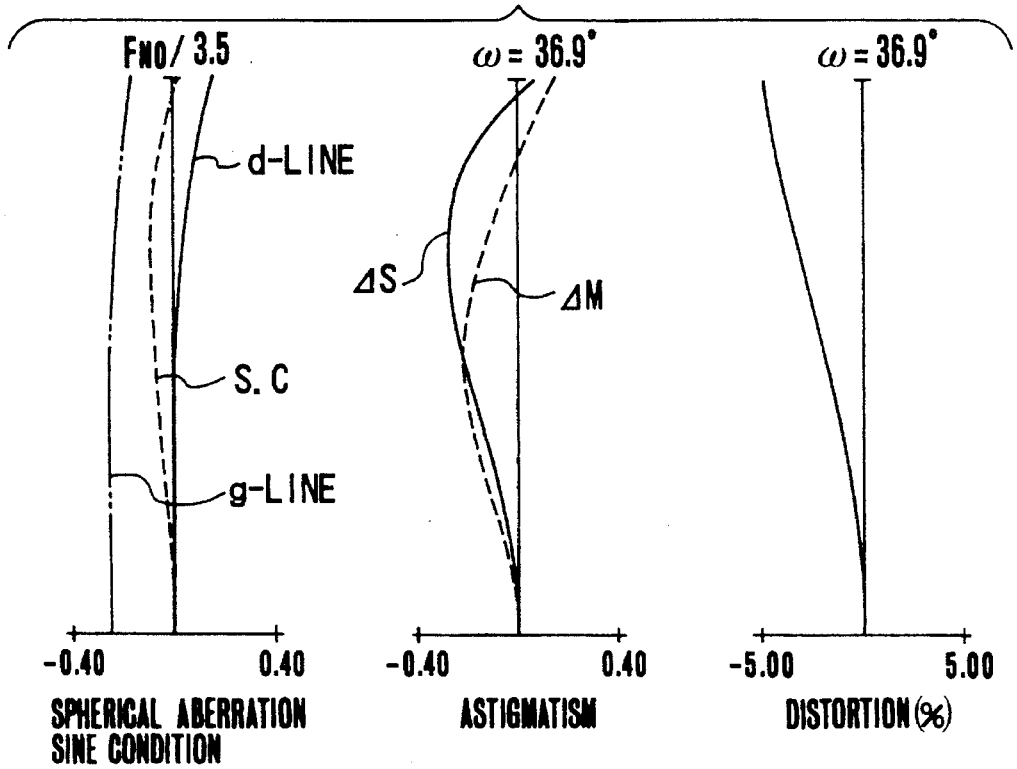
FIGS. 12(A), 12(B) and 12(C) are graphic representations of the various aberrations of the numerical example 3 of the invention in the wide-angle end, an intermediate position and the telephoto end, respectively.
Figure 12B:
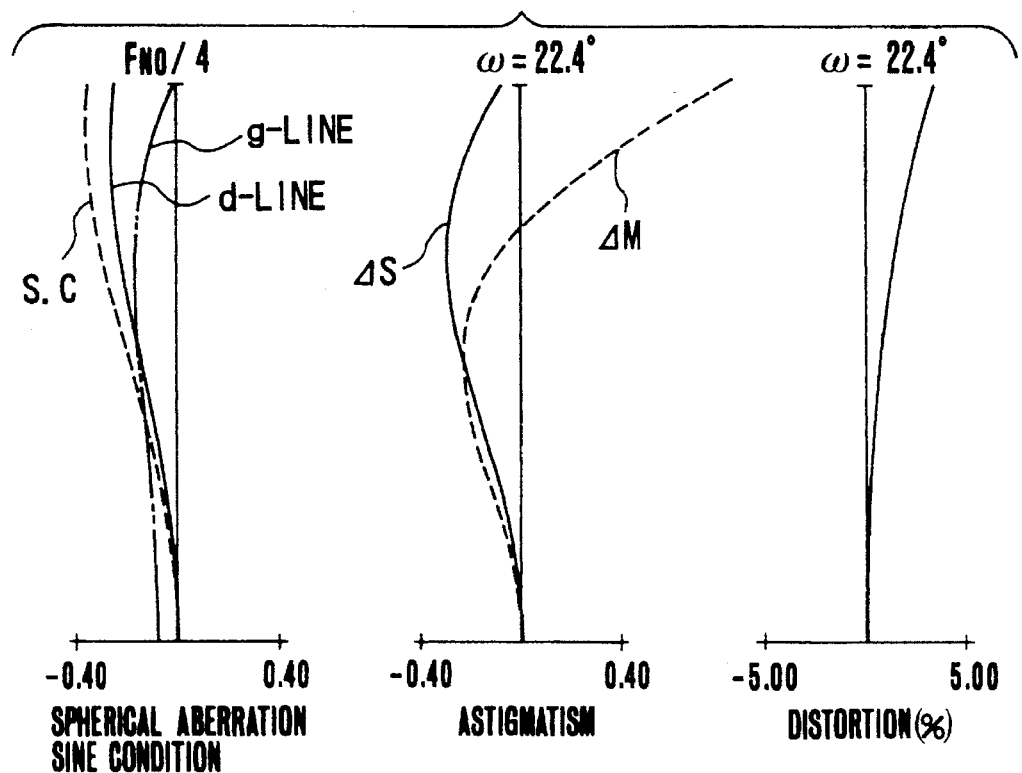
Figure 12C:
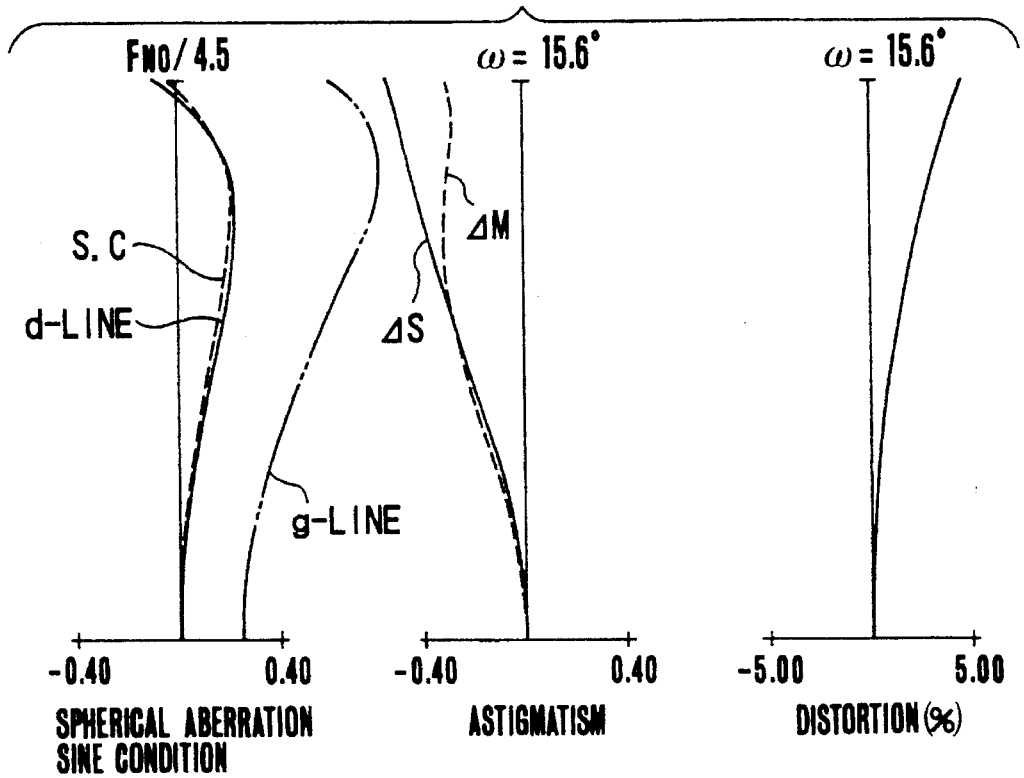
Figure 13A:
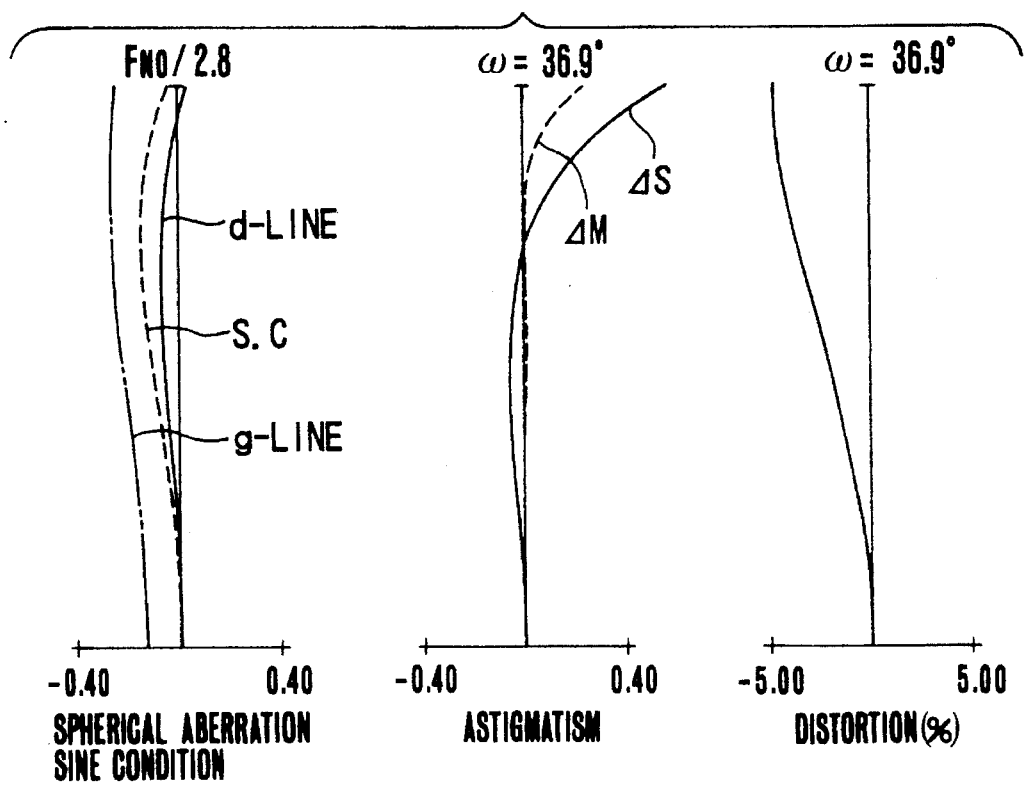
FIGS. 13(A), 13(B) and 13(C) are graphic representations of the various aberrations of the numerical example 4 of the invention in the wide-angle end, an intermediate position and the telephoto end, respectively.
Figure 13B:
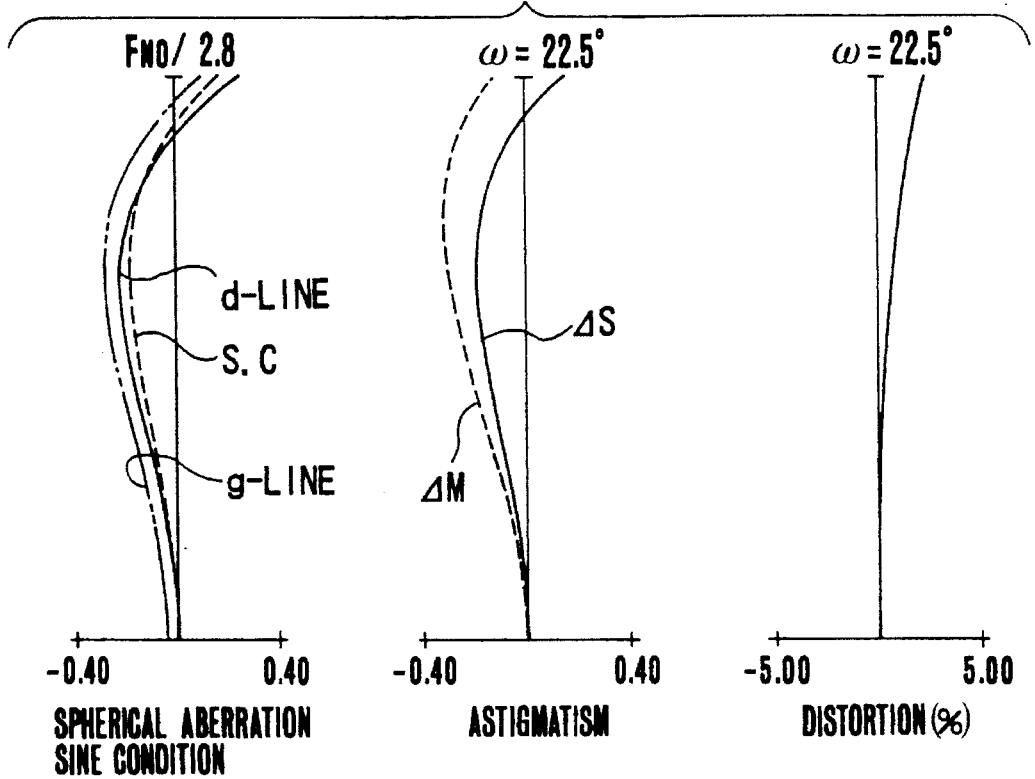
Figure 13C:
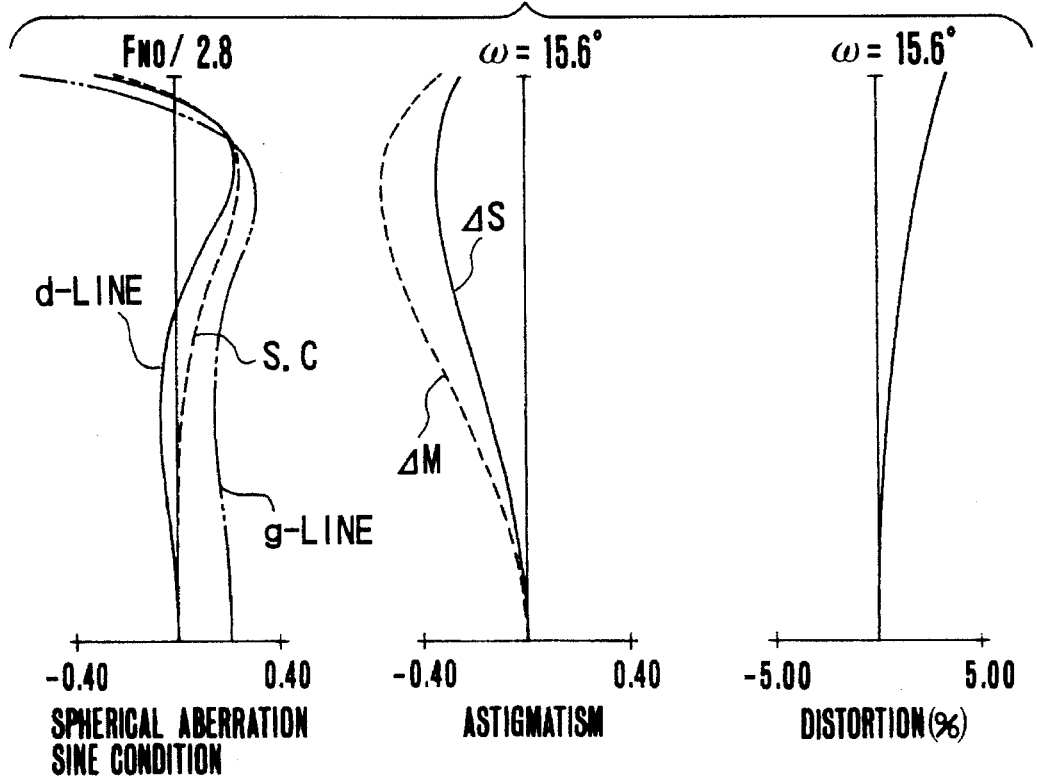
Figure 14A:
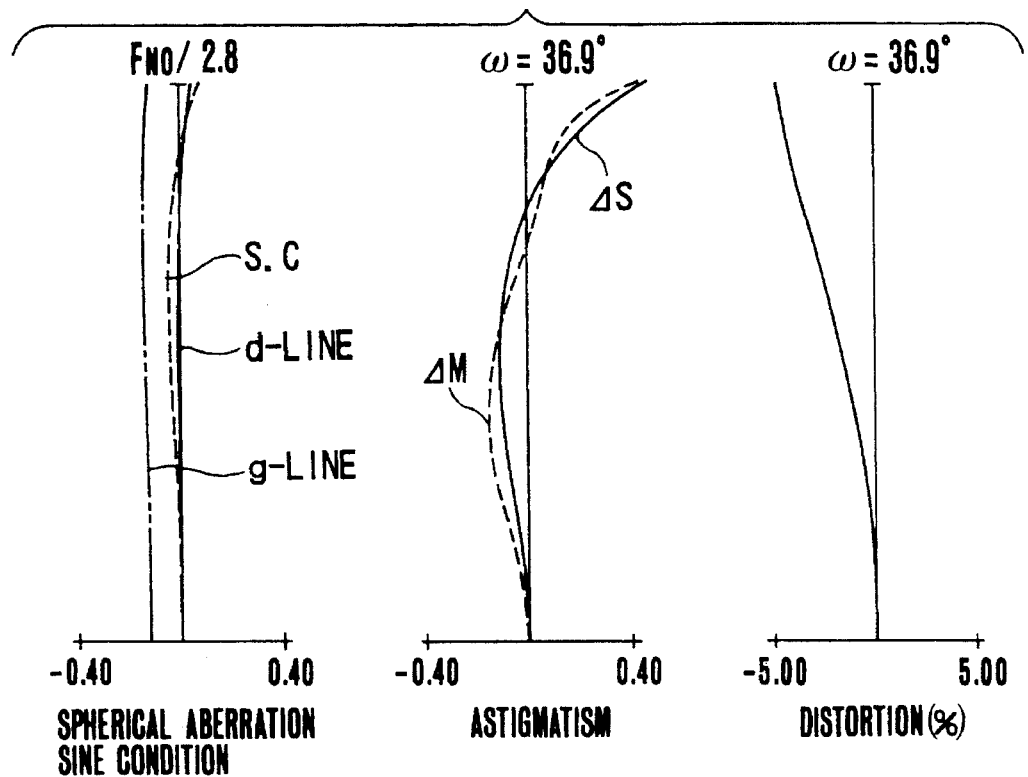
FIGS. 14(A), 14(B) and 14(C) are graphic representations of the various aberrations of the numerical example 5 of the invention in the wide-angle end, an intermediate position and the telephoto end, respectively.
Figure 14B:
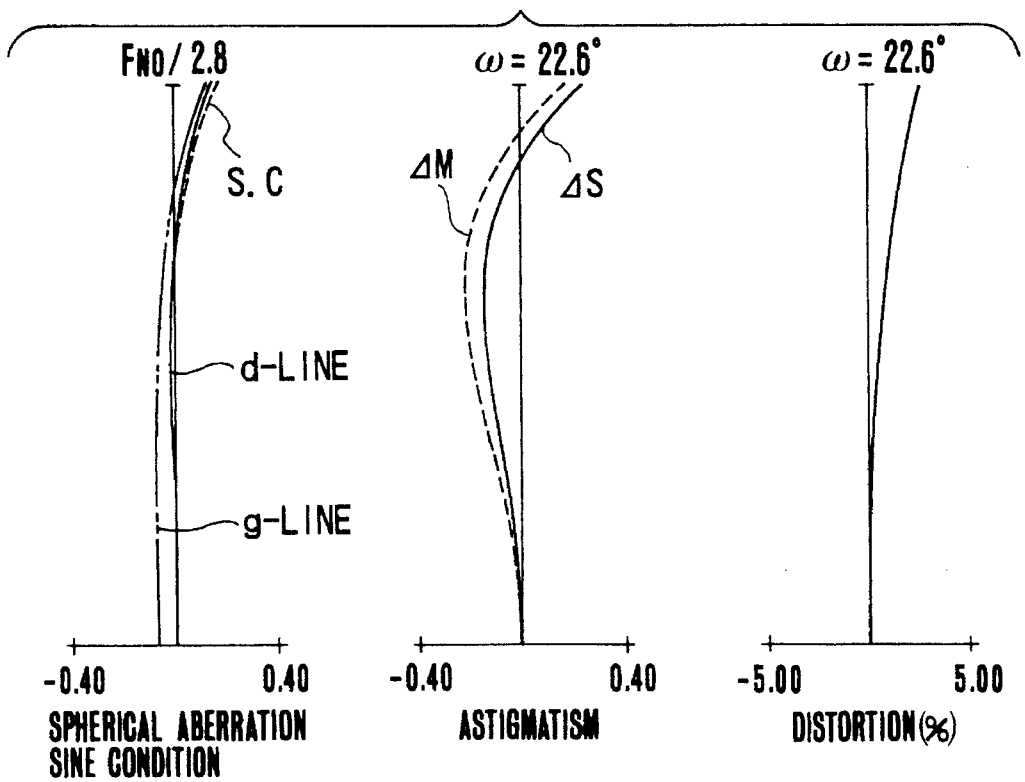
Figure 14C:
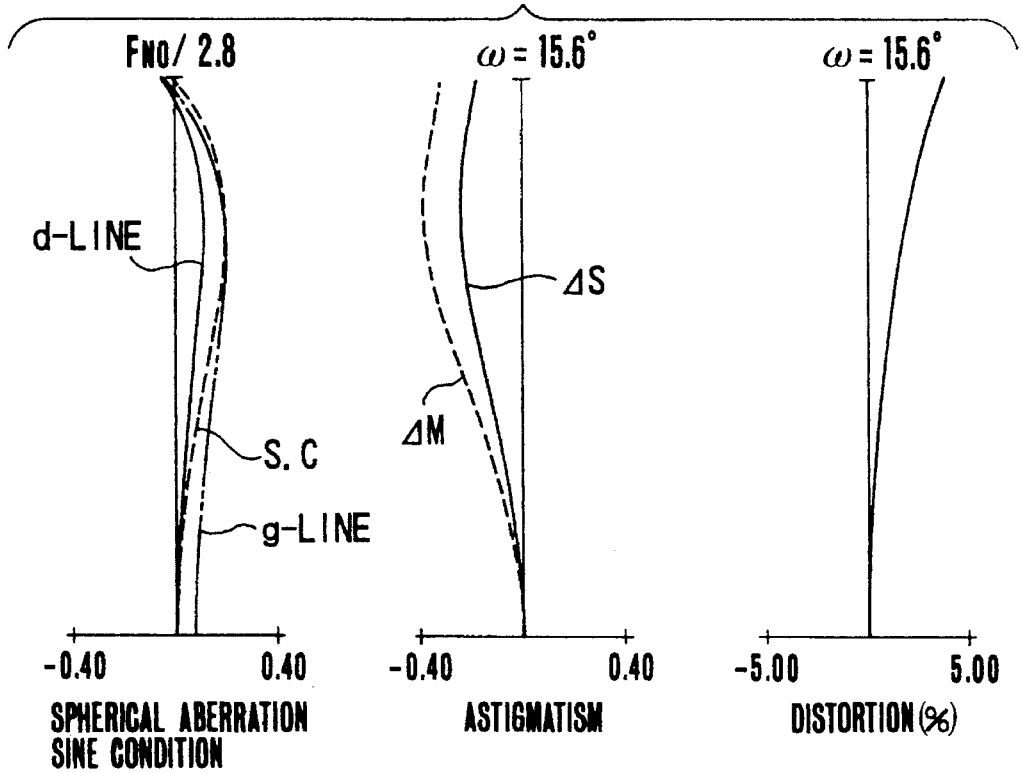
Figure 15A:
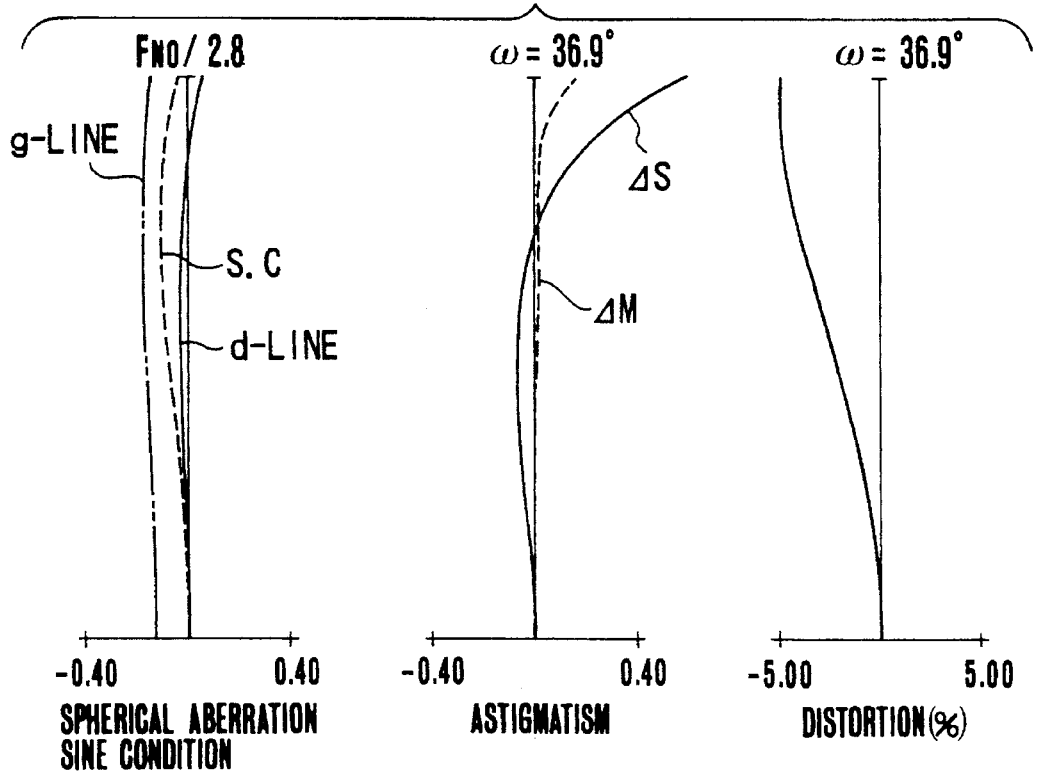
FIGS. 15(A), 15(B) and 15(C) are graphic representations of the various aberrations of the numerical example 6 of the invention in the wide-angle end, an intermediate position and the telephoto end, respectively.
Figure 15B:
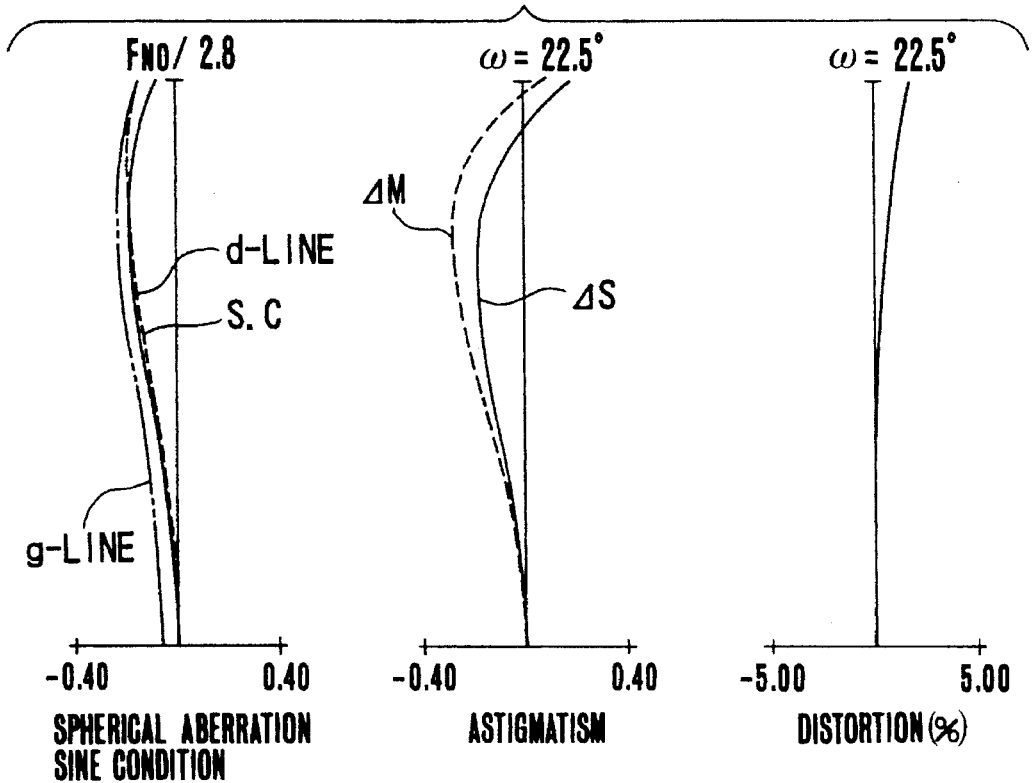
Figure 15C:
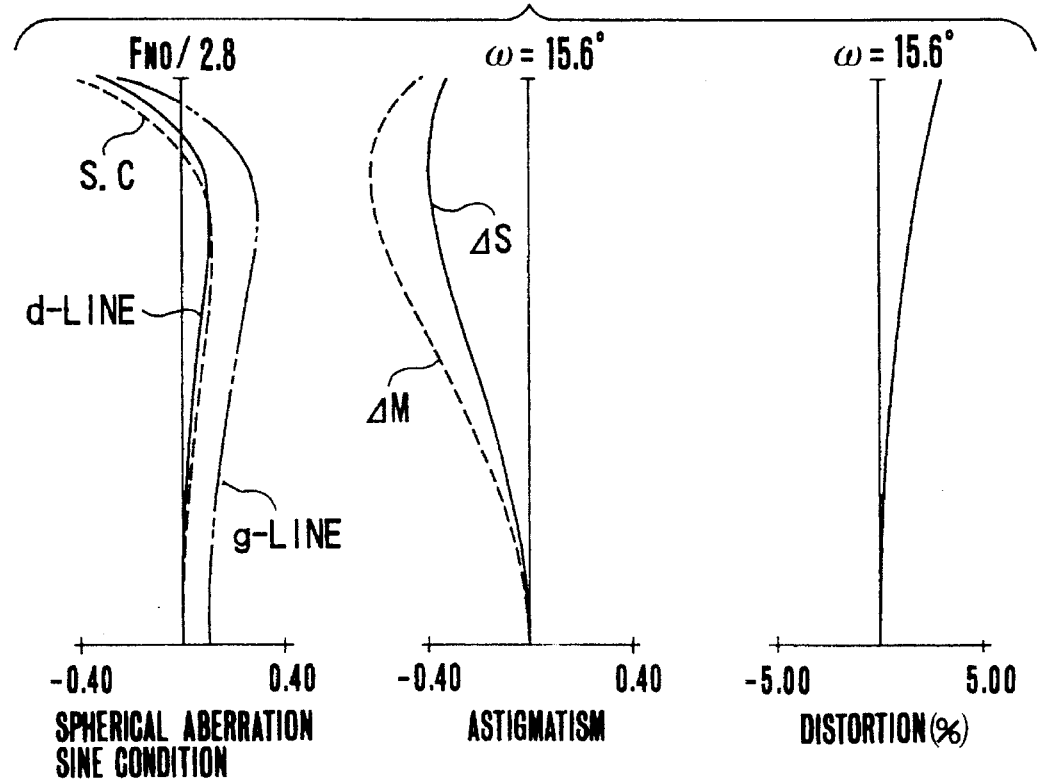
Figure 16A:
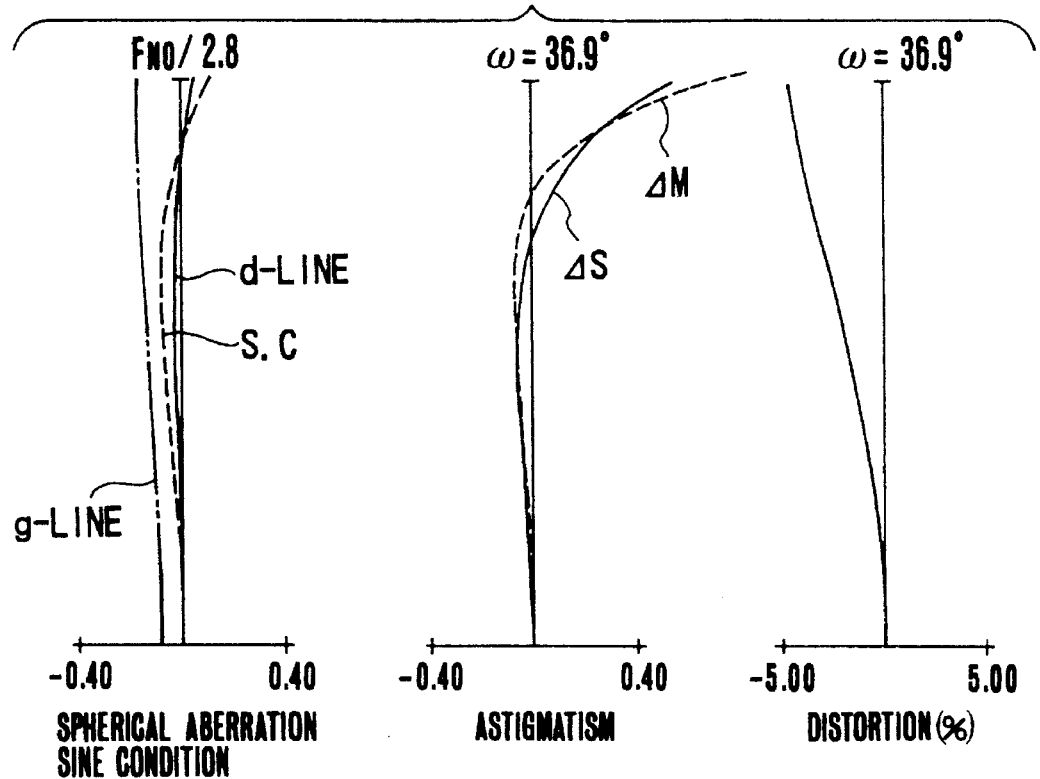
FIGS. 16(A), 16(B) and 16(C) are graphic representations of the various aberrations of the numerical example 7 of the invention in the wide-angle end, an intermediate position and the telephoto end, respectively.
Figure 16B:
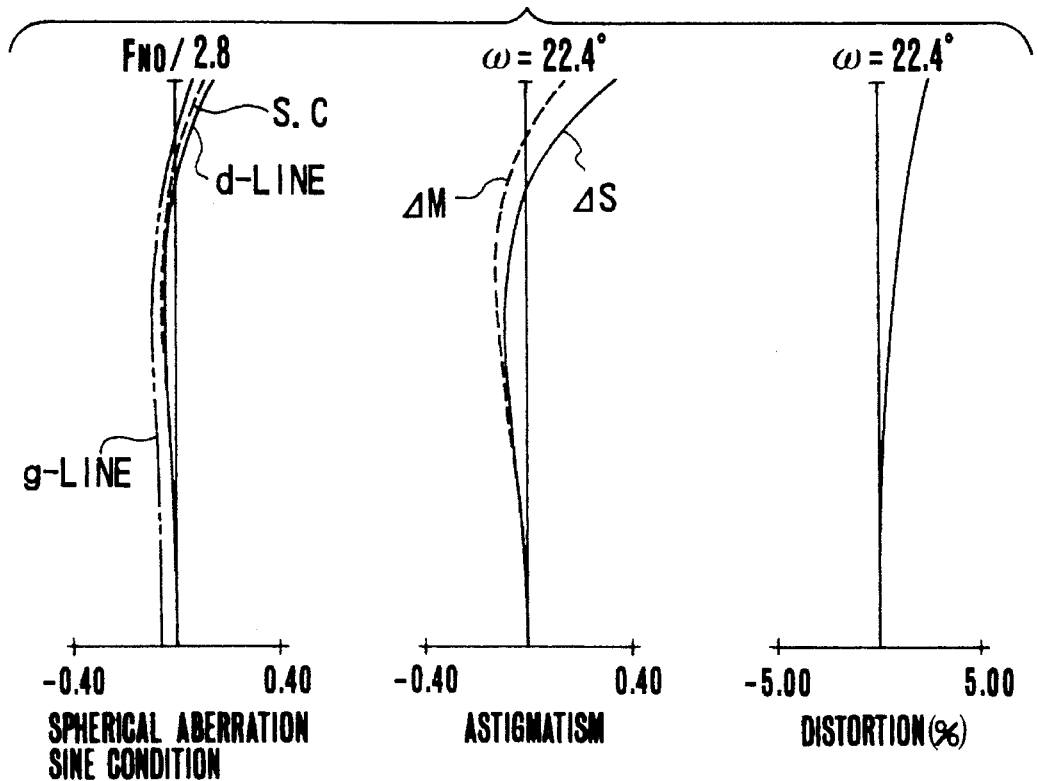
Figure 16C:
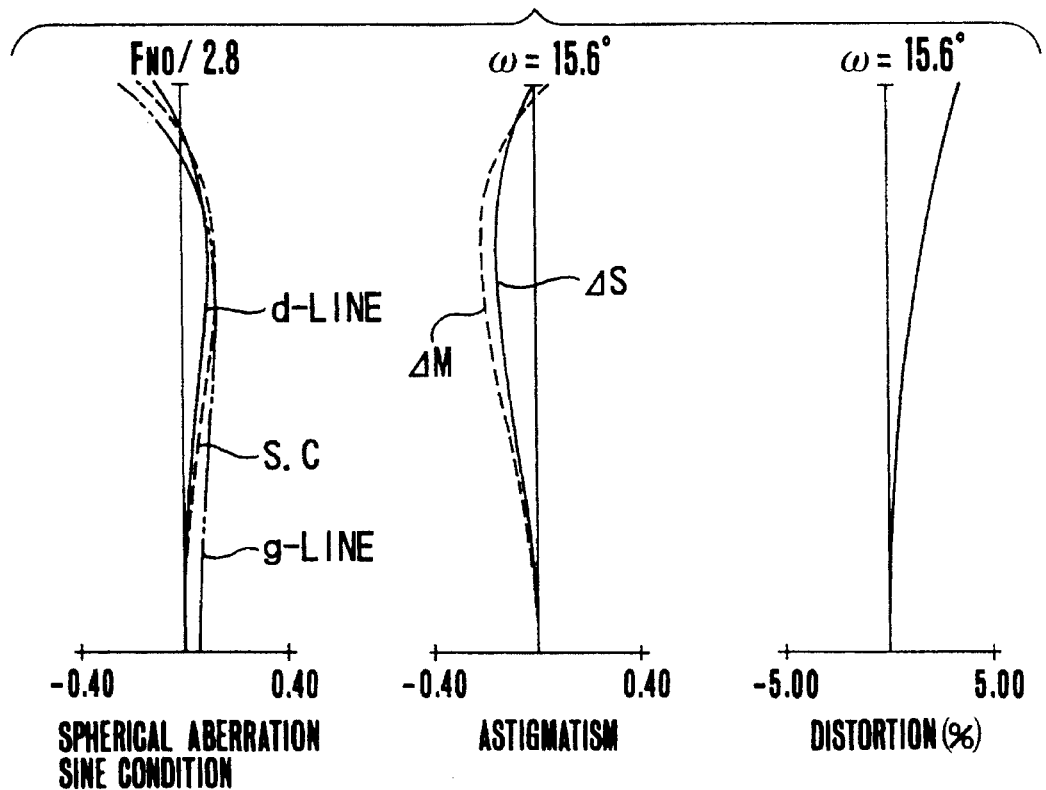
Figure 17A:
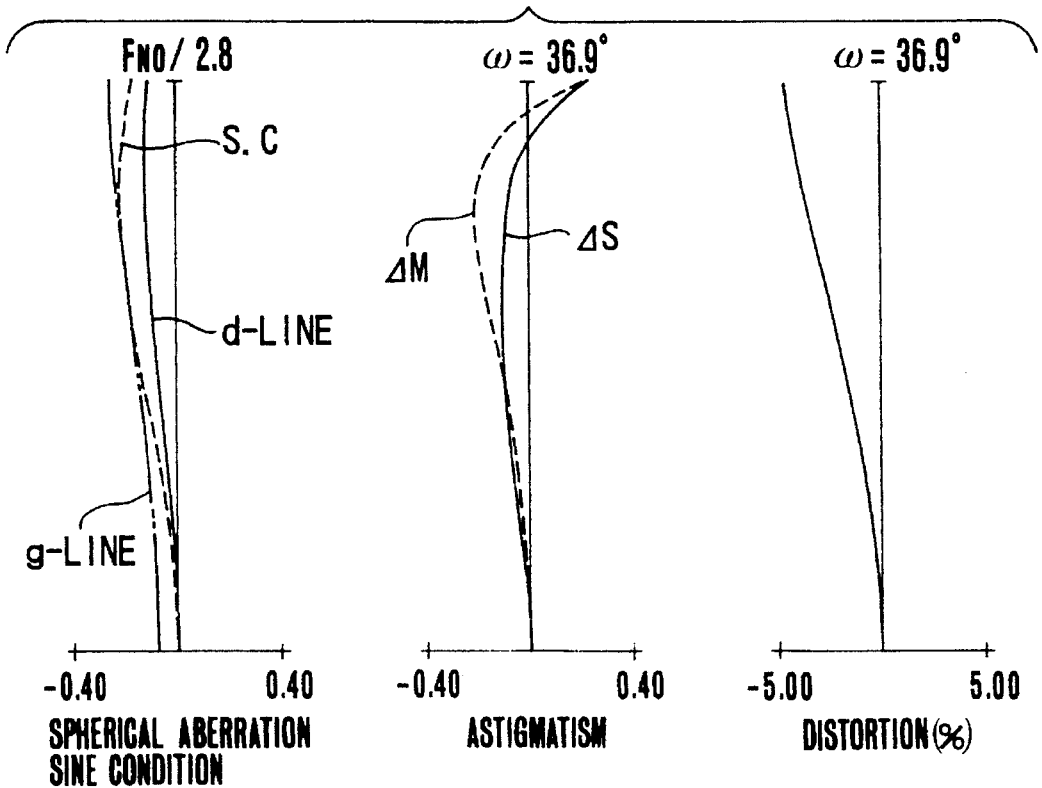
FIGS. 17(A), 17(B) and 17(C) are graphic representations of the various aberrations of the numerical example 8 of the invention in the wide-angle end, an intermediate position and the telephoto end, respectively.
Figure 17B:
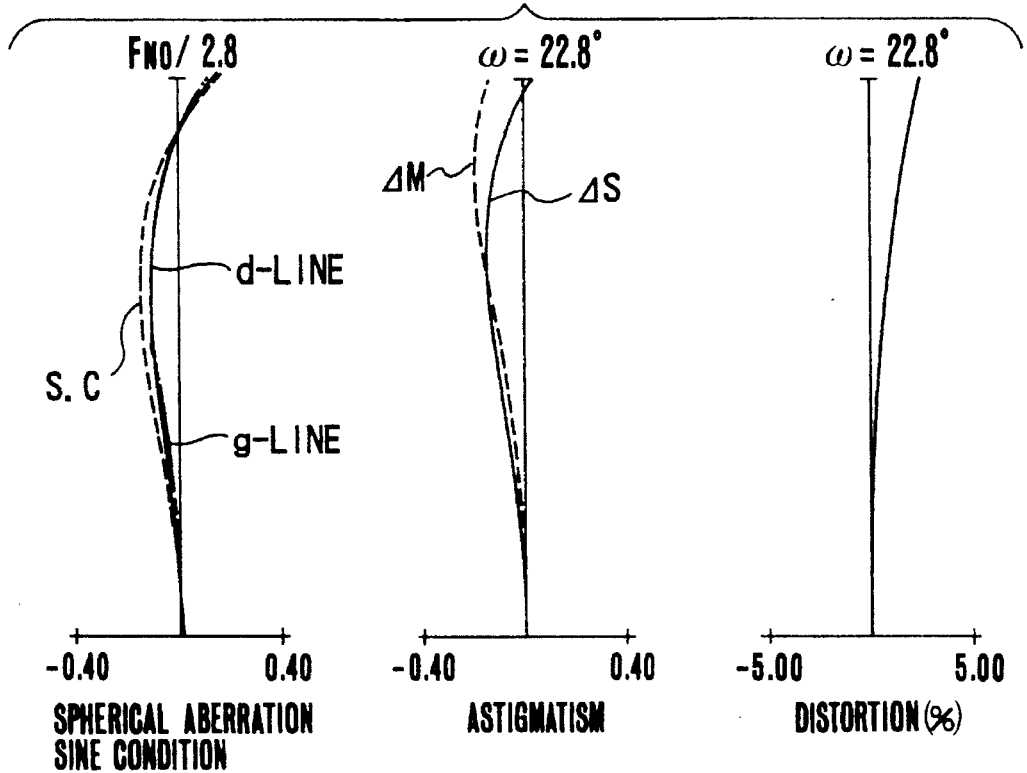
Figure 17C:
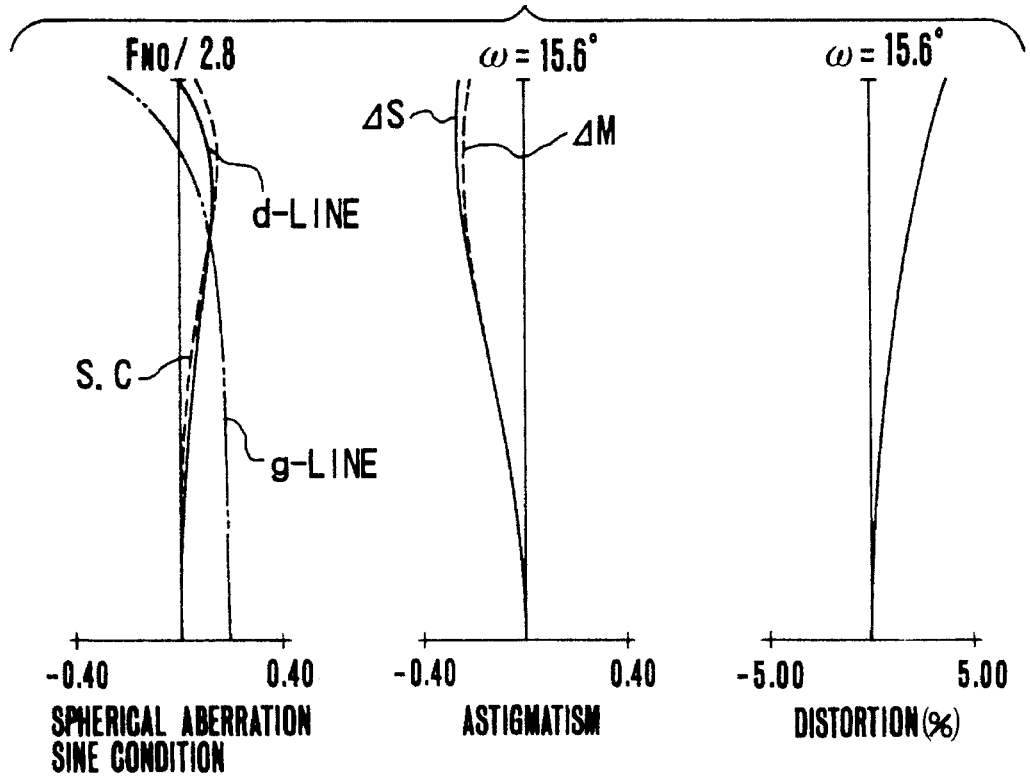
Figure 18A:
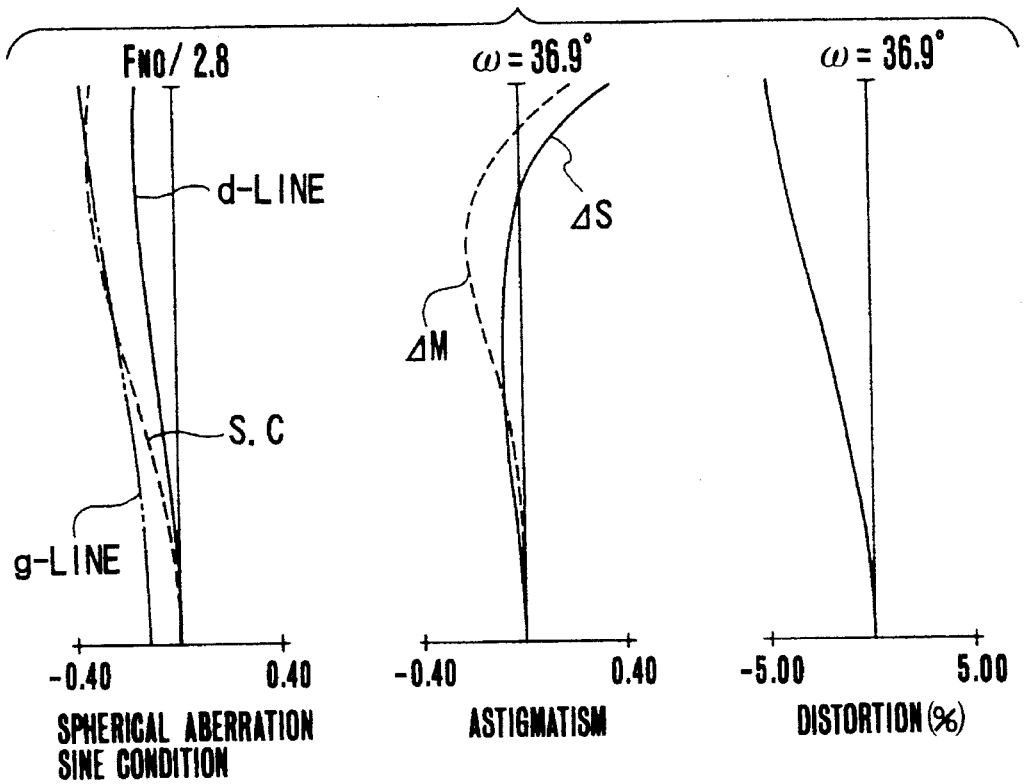
Figure 18B:
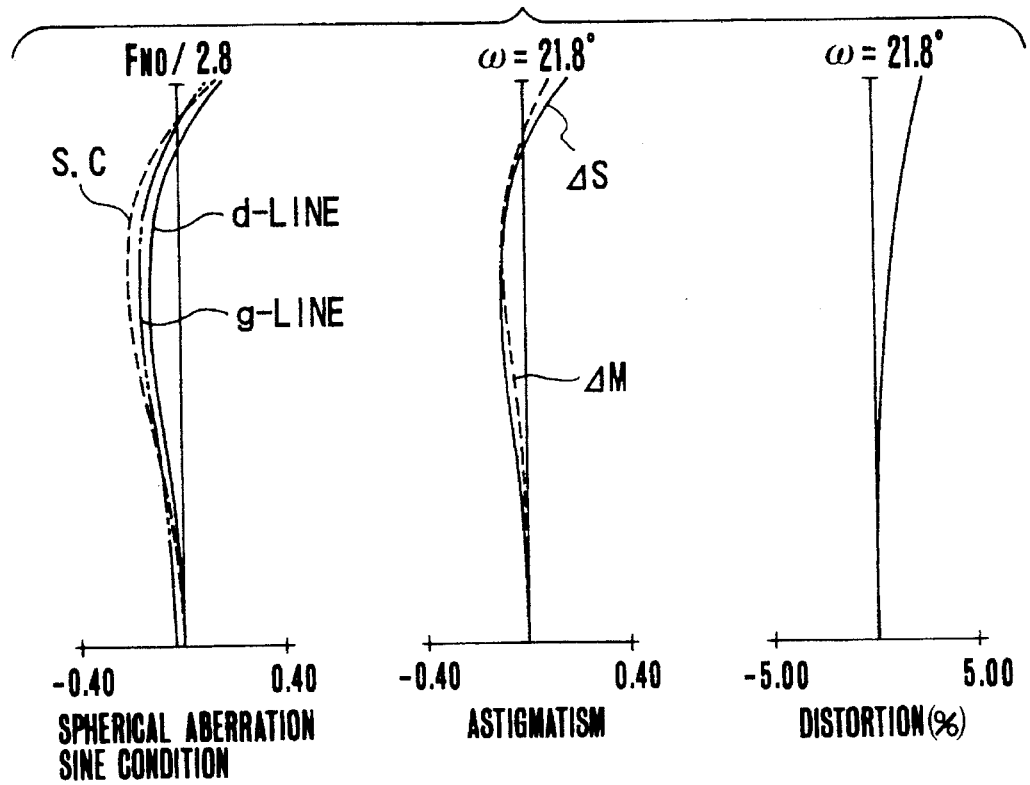

(iv) In the numerical examples 8 and 9 shown in FIGS. 8 and 9, zooming from the wide-angle end to the telephoto end is performed by decreasing the air separation between the first and second lens units, increasing the air separation between the second and third lens units, and decreasing the air separation between the third and fourth lens units. The fourth lens unit includes at least one negative lens and at least one positive lens and has at least one aspheric surface. Letting the refractive power of the aspheric surface be denoted by $\phi 4a$, the radius of curvature of a sphere defined by the intersection point of the aspheric surface with the optical axis and the circle of maximum diameter on the aspheric surface by Rmax, and the radius of curvature of a sphere defined by the intersection point of the aspheric surface with the optical axis and a circle on the aspheric surface at a height H from the optical axis by RH, the following condition is satisfied:

$$(|Rmax|-|RH|) \cdot \phi 4a < 0 \qquad (4-a)$$

Despite the increases of the range and relative aperture, this assures maintenance of high optical performance throughout the entire zooming range.

In the present embodiment, the first lens unit is made negative in refractive power to afford an advantageous lens configuration to the increase of the maximum image angle. Furthermore, in addition to the first and second lens units, the third and fourth lens units are used to share the variation of the focal length. Thus, it is made easy to achieve a great increase of the zooming range.

In another general rule, for a reduction of the bulk and size of the entire lens system under the condition of the high range and the large relative aperture, there is need to strengthen the refractive power of each of the lens units. With this, large aberrations are produced. So, the number of lens elements has to be increased for correcting purposes.

In the present embodiment, therefore, the form and the arrangement of the members of the fourth lens unit are properly determined. Particularly with the use of the aspheric surface in combination, a small number of lens members is sufficient for the spherical aberration and astigmatism and others to be corrected well.

The inequality of condition (4–a) gives to the aspheric surface in the fourth lens unit a shape that the positive refractive power gets progressively weaker as the height from the optical axis increases to thereby effectively correct mainly aspherical aberration and astigmatism. When the condition (4–a) is violated, the aspherical aberration and astigmatism increase largely. To correct these, the number of members of the fourth lens unit must be increased. As a result, the total length of the complete lens becomes long objectionably.

Besides these, the numerical examples of the present embodiment have their first lens units included with at least two negative lenses and a positive lens. This simultaneously fulfills the requirements of shortening the shortest focal length to achieve the increase of the angle of field of view and of minimizing the outer diameter of the first lens unit. In addition, good correction of astigmatism and distortion is attained.

The second lens unit includes a cemented lens composed of a negative first lens of meniscus shape having a convex surface facing the object side and a positive second lens whose surfaces both are convex and a positive third lens having a strong positive refracting surface facing the object side, wherein the following condition is satisfied:

$$0.6 < R2,2/F2 < 1.0 \quad (4\text{-b})$$

where R2,2 is the radius of curvature of the cemented surface of the cemented lens, and F2 is the focal length of the second lens unit.

Since, in the present embodiment, the first lens unit has a negative refractive power, the axial light beam arrives on the second lens unit at a higher position from the optical axis than with the first lens unit. For this reason, aberrations are liable to be generated. So, the members of the second lens unit are constructed and arranged in the ways described above. Thus, a good correction of various aberrations is attained.

The inequalities of condition (4–b) give a proper range for the radius of curvature of the cemented surface of the cemented lens in order to effectively correct mainly coma. When the radius of curvature R2,2 is made smaller as exceeding the lower limit of condition (4–b), over-correction of coma results. Conversely when the radius of curvature R2,2 is made larger as exceeding the upper limit, it becomes difficult to correct the residual coma by using any other surfaces.

The numerical data for the specific examples 1 to 9 of the invention are shown below. In the tables of the examples 1 to 9, Ri is the radius of curvature of the i-th lens surface when counted from the object side, Di is the i-th lens thickness or air separation when counted from the object side, and Ni and $\nu$i are respectively the refractive index and Abbe number of the glass of the i-th lens element when counted from the object side.

The shape of an aspheric surface is expressed with the coordinates with an X axis in the axial direction and an H axis in the perpendicular direction to the optical axis, the direction in which light advances being taken positive, by the following equation:

$$X = \frac{(1/R) H^2}{1 + \sqrt{1 - (H/R)^2}} + AH^2 + BH^4 + CH^6 + DH^8 + EH^{10}$$

where R is the radius of the osculating sphere, and A, B, C, D and E are the aspheric coefficients.

Numerical Example 1:

(FIGS. 1, 10(A), 10(B) and 10(C))

| F = 28.8–77.3 | FNO = 1:3.5–4.5 | 2ω = 73.8°–31.3° | |
|---|---|---|---|
| R 1 = 57.039 | D 1 = 1.80 | N 1 = 1.77250 | $\nu$ 1 = 49.6 |
| R 2 = 23.561 | D 2 = 6.90 | | |
| R 3 = –13365.018 | D 3 = 1.60 | N 2 = 1.77250 | $\nu$ 2 = 49.6 |
| R 4 = 40.913 | D 4 = 0.10 | | |
| R 5 = 30.586 | D 5 = 3.90 | N 3 = 1.80518 | $\nu$ 3 = 25.4 |
| R 6 = 65.175 | D 6 = Variable | | |
| R 7 = 61.327 | D 7 = 1.50 | N 4 = 1.84666 | $\nu$ 4 = 23.9 |
| R 8 = 25.956 | D 8 = 0.07 | | |
| R 9 = 27.135 | D 9 = 4.00 | N 5 = 1.69680 | $\nu$ 5 = 55.5 |
| R10 = –157.956 | D10 = 0.10 | | |
| R11 = 35.052 | D11 = 3.15 | N 6 = 1.69680 | $\nu$ 6 = 55.5 |
| R12 = –166.755 | D12 = Variable | | |
| R13 = (Stop) | D13 = 1.75 | | |
| R14 = –51.650 | D14 = 2.10 | N 7 = 1.80518 | $\nu$ 7 = 25.4 |
| R15 = –25.090 | D15 = 1.30 | N 8 = 1.60311 | $\nu$ 8 = 60.7 |
| R16 = 46.084 | D16 = Variable | | |
| R17 = 122.517 | D17 = 1.30 | N 9 = 1.80518 | $\nu$ 9 = 25.4 |
| R18 = 31.966 | D18 = 0.42 | | |
| R19 = 35.150 | D19 = 5.00 | N10 = 1.58313 | $\nu$10 = 59.4 |
| R20 = –37.015 (Aspheric) | | | |
| R21 = 0.0 | | | |

| Variable | Focal Length | | |
|---|---|---|---|
| Separation | 28.80 | 52.36 | 77.30 |
| D 6 | 40.37 | 11.65 | 1.03 |
| D12 | 2.14 | 10.74 | 19.34 |
| D16 | 18.91 | 10.31 | 1.71 |

R20: Aspheric Surface
 The Values of the Aspheric Coefficients

| | |
|---|---|
| A = 0 | B = 4.88934 × 10$^{-6}$ |
| C = –6.38115 × 10$^{-9}$ | D = 1.53483 × 10$^{-1}$ |
| E = –5.17930 × 10$^{-13}$ | |

Numerical Example 2:

(FIGS. 2, 11(A), 11(B) and 11(C))

| | F = 28.8–77.01 | FNO = 1:3.5–4.5 | 2ω = 73.8°–31.4° | |
|---|---|---|---|---|
| R 1 = 69.290 | D 1 = 1.80 | N 1 = 1.77250 | ν 1 = 49.6 |
| R 2 = 26.715 | D 2 = 6.90 | | |
| R 3 = 3674.837 | D 3 = 1.60 | N 2 = 1.77250 | ν 2 = 49.6 |
| R 4 = 37.386 | D 4 = 0.10 | | |
| R 5 = 31.958 | D 5 = 3.90 | N 3 = 1.80518 | ν 3 = 25.4 |
| R 6 = 69.851 | D 6 = Variable | | |
| R 7 = 62.034 | D 7 = 1.50 | N 4 = 1.84666 | ν 4 = 23.9 |
| R 8 = 25.952 | D 8 = 0.07 | | |
| R 9 = 26.641 | D 9 = 4.00 | N 5 = 1.69680 | ν 5 = 55.5 |
| R10 = –110.081 | D10 = 0.10 | | |
| R11 = 31.365 | D11 = 3.15 | N 6 = 1.69680 | ν 6 = 55.5 |
| R12 = –395.214 | D12 = Variable | | |
| R13 = (Stop) | D13 = 1.75 | | |
| R14 = –55.195 | D14 = 2.10 | N 7 = 1.80518 | ν 7 = 25.4 |
| R15 = –25.214 | D15 = 1.30 | N 8 = 1.60311 | ν 8 = 60.7 |
| R16 = 38.462 | D16 = Variable | | |
| R17 = 78.946 | D17 = 1.30 | N 9 = 1.80518 | ν 9 = 25.4 |
| R18 = 26.654 | D18 = 0.42 | | |
| R19 = 29.350 | D19 = 5.00 | N10 = 1.58313 | ν10 = 59.4 |
| R20 = –44.797 (Aspheric) | | | |
| R21 = 0.0 | | | |

| Variable | Focal Length | | |
|---|---|---|---|
| Separation | 28.80 | 52.30 | 77.01 |
| D 6 | 39.81 | 11.56 | 1.01 |
| D12 | 2.34 | 10.34 | 18.34 |
| D16 | 17.95 | 9.95 | 1.95 |

R20: Aspheric Surface
  The Values of the Aspheric Coefficients:

| A = 0 | B = 4.54988 × 10⁻⁶ |
|---|---|
| C = 3.91367 × 10⁻⁹ | D = 1.11697 × 10⁻¹⁰ |
| E = –6.30557 × 10⁻¹³ | |

$A = 0$
$B = 4.54988 \times 10^{-6}$
$C = 3.91367 \times 10^{-9}$
$D = 1.11697 \times 10^{-10}$
$E = -6.30557 \times 10^{-13}$ Numeral Example 3:

(FIGS. 3, 12(A), 12(B) and 12(C))

| | F = 28.8–77.38 | FNO = 1:3.5–4.5 | 2ω = 73.8°–31.2° | |
|---|---|---|---|---|
| R 1 = 67.090 | D 1 = 1.80 | N 1 = 1.77250 | ν 1 = 49.6 |
| R 2 = 27.602 | D 2 = 6.80 | | |
| R 3 = –912.555 | D 3 = 1.60 | N 2 = 1.77250 | ν 2 = 49.6 |
| R 4 = 36.134 | D 4 = 0.10 | | |
| R 5 = 31.918 | D 5 = 3.90 | N 3 = 1.80518 | ν 3 = 25.4 |
| R 6 = 73.004 | D 6 = Variable | | |
| R 7 = 48.711 | D 7 = 1.50 | N 4 = 1.84666 | ν 4 = 23.9 |
| R 8 = 22.792 | D 8 = 4.00 | N 5 = 1.69680 | ν 5 = 55.5 |
| R 9 = –89.964 | D 9 = 0.10 | | |
| R10 = 31.279 | D10 = 3.10 | N 6 = 1.69680 | ν 6 = 55.5 |
| R11 = 248.913 | D11 = Variable | | |
| R12 = (Stop) | D12 = 1.75 | | |
| R13 = –51.342 | D13 = 2.10 | N 7 = 1.80518 | ν 7 = 25.4 |
| R14 = –23.117 | D14 = 1.30 | N 8 = 1.60311 | ν 8 = 60.7 |
| R15 = 38.796 | D15 = Variable | | |
| R16 = 76.641 | D16 = 1.30 | N 9 = 1.84666 | ν 9 = 23.9 |
| R17 = 29.240 | D17 = 0.45 | | |
| R18 = 32.398 | D18 = 5.00 | N10 = 1.5813 | ν10 = 59.4 |
| R19 = –45.125 (Aspheric) | | | |

| Variable | Focal Length | | |
|---|---|---|---|
| Separation | 28.80 | 52.46 | 77.38 |
| D 6 | 40.21 | 12.05 | 1.58 |
| D11 | 1.96 | 9.96 | 17.96 |
| D15 | 17.67 | 9.67 | 1.67 |

R19: Aspheric Surface
The Values of the Aspheric Coefficients:

| $A = 0$ | $B = 4.7416 \times 10^{-6}$ |
|---|---|
| $C = 3.16871 \times 10^{-8}$ | $D = -1.19894 \times 10^{-10}$ |
| $E = 2.29582 \times 10^{-13}$ | |

Numerical Example 4:

(FIGS. 4, 13(A), 13(B) and 13(C))

| $F = 28.8$–$77.49$ | $FNO = 1:2.8$ | $2\omega = 73.8°$–$31.2°$ | |
|---|---|---|---|
| R 1 = 90.226 | D 1 = 2.00 | N 1 = 1.77250 | ν 1 = 49.6 |
| R 2 = 38.296 | D 2 = 9.00 | | |
| R 3 = −461.888 | D 3 = 4.50 | N 2 = 1.69895 | ν 2 = 30.1 |
| R 4 = −96.235 | D 4 = 0.12 | | |
| R 5 = −179.098 | D 5 = 1.80 | N 3 = 1.77250 | ν 3 = 49.6 |
| R 6 = 59.711 | D 6 = 1.70 | | |
| R 7 = 39.696 | D 7 = 2.90 | N 4 = 1.84666 | ν 4 = 23.9 |
| R 8 = 48.254 | D 8 = Variable | | |
| R 9 = 61.886 | D 9 = 1.50 | N 5 = 1.84666 | ν 5 = 23.8 |
| R10 = 36.536 | D10 = 7.00 | N 6 = 1.71300 | ν 6 = 53.8 |
| R11 = −92.015 | D11 = 0.10 | | |
| R12 = 43.139 (Aspheric) | D12 = 5.50 | N 7 = 1.77250 | ν 7 = 49.6 |
| R13 = −469.393 | D13 = 1.50 | N 8 = 1.84666 | ν 8 = 23.8 |
| R14 = 129.333 | D14 = Variable | | |
| R15 = (Stop) | D15 = 1.00 | | |
| R16 = 805.385 | D16 = 4.10 | N 9 = 1.84666 | ν 9 = 23.8 |
| R17 = −23.912 | D17 = 1.10 | N10 = 1.77250 | ν10 = 49.6 |
| R18 = 56.787 | D18 = 2.80 | | |
| R19 = −32.304 | D19 = 1.10 | N11 = 1.83481 | ν11 = 42.7 |
| R20 = −279.112 | D20 = Variable | | |
| R21 = −61.974 | D21 = 1.20 | N12 = 1.84666 | ν12 = 23.8 |
| R22 = 82.543 | D22 = 3.80 | N13 = 1.71300 | ν13 = 53.8 |
| R23 = −34.909 | D23 = 0.10 | | |
| R24 = 49.546 | D24 = 1.80 | N14 = 1.76182 | ν14 = 26.5 |
| R25 = 39.572 | D25 = 3.50 | | |
| R26 = −706.308 | D26 = 2.80 | N15 = 1.69680 | ν15 = 55.5 |
| R27 = −64.519 | D27 = 0.10 | | |
| R28 = 77.104 | D28 = 4.80 | N16 = 1.71300 | ν16 = 53.8 |
| R29 = −104.361 | D29 = 1.40 | N17 = 1.84666 | ν17 = 23.8 |
| R30 = −193.661 | | | |

| Variable | Focal Length | | |
|---|---|---|---|
| Separation | 28.80 | 52.29 | 77.49 |
| D 8 | 48.37 | 14.88 | 2.28 |
| D14 | 1.82 | 11.82 | 21.82 |
| D20 | 10.45 | 6.0 | 1.56 |

R12: Aspheric Surface
The Values of the Aspheric Coefficients:

| $A = 0$ | $B = -1.67796 \times 10^{-7}$ |
|---|---|
| $C = -1.68935 \times 10^{-9}$ | $D = -1.43301 \times 10^{-12}$ |

Numerical Example 5:

(FIGS. 5, 14(A), 14(B) and 14(C))

| F = 28.8–77.63 | FNO = 1:2.8 | 2ω = 73.8°–31.1° | |
|---|---|---|---|
| R 1 = 107.701 (Aspheric) | D 1 = 2.20 | N 1 = 1.83481 | ν 1 = 42.7 |
| R 2 = 43.329 | D 2 = 16.00 | | |
| R 3 = −663.644 | D 3 = 2.00 | N 2 = 1.83481 | ν 2 = 42.7 |
| R 4 = 35.965 | D 4 = 5.00 | N 3 = 1.84666 | ν 3 = 23.8 |
| R 5 = 96.556 | D 5 = 1.50 | | |
| R 6 = 56.255 | D 6 = 2.50 | N 4 = 1.84666 | ν 4 = 23.8 |
| R 7 = 62.609 | D 7 = Variable | | |
| R 8 = 78.988 (Aspheric) | D 8 = 1.50 | N 5 = 1.84666 | ν 5 = 23.8 |
| R 9 = 39.104 | D 9 = 7.50 | N 6 = 1.71300 | ν 6 = 53.8 |
| R10 = −85.722 | D10 = 0.10 | | |
| R11 = 41.699 | D11 = 7.00 | N 7 = 1.77250 | ν 7 = 49.6 |
| R12 = −136.277 | D12 = 1.50 | N 8 = 1.84666 | ν 8 = 23.8 |
| R13 = 183.298 | D13 = Variable | | |
| R14 = (Stop) | D14 = 1.00 | | |
| R15 = 413.138 | D15 = 4.10 | N 9 = 1.84666 | ν 9 = 23.8 |
| R16 = −27.684 | D16 = 1.10 | N10 = 1.77250 | ν10 = 49.6 |
| R17 = 53.170 | D17 = 2.80 | | |
| R18 = −32.983 | D18 = 1.10 | N11 = 1.83481 | ν11 = 42.7 |
| R19 = −4847.456 | D19 = Variable | | |
| R20 = −80.792 | D20 = 1.20 | N12 = 1.84666 | ν12 = 23.8 |
| R21 = −461.613 | D21 = 3.50 | N13 = 1.71300 | ν13 = 53.8 |
| R22 = −36.396 | D22 = 0.10 | | |
| R23 = 45.586 | D23 = 1.80 | N14 = 1.76182 | ν14 = 26.5 |
| R24 = 37.053 | D24 = 3.50 | | |
| R25 = −159.162 | D25 = 2.50 | N15 = 1.69680 | ν15 = 55.5 |
| R26 = −56.467 | D26 = 0.10 | | |
| R27 = 95.167 | D27 = 5.00 | N16 = 1.71300 | ν16 = 53.8 |
| R28 = −47.606 | D28 = 1.40 | N17 = 1.84666 | ν17 = 23.8 |
| R29 = −121.554 | | | |

| Variable | Focal Length | | |
|---|---|---|---|
| Separation | 28.8 | 51.91 | 77.63 |
| D 7 | 44.57 | 13.71 | 1.67 |
| D13 | 1.29 | 11.29 | 21.29 |
| D19 | 10.32 | 5.88 | 1.44 |

R1: Aspheric Surface
  The values of the Aspheric Coefficients:

| A = 0 | B = 7.15543 × 10$^{-7}$ |
|---|---|
| C = −2.45904 × 10$^{-10}$ | D = −1.41751 × 10$^{-13}$ |

R8: Aspheric Surface
  The Values of the Aspheric Coefficients:

The Values of the Aspheric Coefficients:

| A = 0 | B = 3.12771 × 10$^{-7}$ |
|---|---|
| C = 9.59892 × 10$^{-11}$ | |

Numerical Example 6:
  (FIGS. 6, 15(A), 15(B) and 15(C))

| F = 28.8–77.43 | FNO = 1:2.8 | 2ω = 73.8°–31.2° | |
|---|---|---|---|
| R 1 = 72.775 | D 1 = 2.00 | N 1 = 1.77250 | ν 1 = 49.6 |
| R 2 = 37.706 | D 2 = 9.00 | | |
| R 3 = −474.784 | D 3 = 4.50 | N 2 = 1.69895 | ν 2 = 30.1 |
| R 4 = −94.031 | D 4 = 0.12 | | |
| R 5 = −151.662 | D 5 = 1.80 | N 3 = 1.77250 | ν 3 = 49.6 |
| R 6 = 60.031 | D 6 = 1.70 | | |
| R 7 = 40.187 | D 7 = 2.90 | N 4 = 1.84666 | ν 4 = 23.9 |

-continued

| F = 28.8–77.43 | FNO = 1:2.8 | 2ω = 73.8°–31.2° | |
|---|---|---|---|
| R 8 = 46.071 | D 8 = Variable | | |
| R 9 = 77.426 | D 9 = 1.50 | N 5 = 1.84666 | ν 5 = 23.8 |
| R10 = 35.026 | D10 = 7.00 | N 6 = 1.71300 | ν 6 = 53.8 |
| R11 = −89.434 (Aspheric) | D11 = 0.10 | | |
| R12 = 39.339 | D12 = 5.50 | N 7 = 1.77250 | ν 7 = 49.6 |
| R13 = 244.065 | D13 = 1.50 | N'18 = 1.84666 | ν 8 = 23.8 |
| R14 = 139.168 | D14 = Variable | | |
| R15 = (Stop) | D15 = 1.00 | | |
| R16 = 289.330 | D16 = 4.10 | N 9 = 1.84666 | ν 9 = 23.8 |
| R17 = −24.625 | D17 = 1.10 | N10 = 1.77250 | ν10 = 49.6 |
| R18 = 54.408 | D18 = 2.80 | | |
| R19 = −31.708 | D19 = 1.10 | N11 = 1.83481 | ν11 = 42.7 |
| R20 = −632.173 | D20 = Variable | | |
| R21 = −58.935 | D21 = 1.20 | N12 = 1.84666 | ν12 = 23.8 |
| R22 = 83.573 | D22 = 3.80 | N13 = 1.71300 | ν13 = 53.8 |
| R23 = −33.512 | D23 = 0.10 | | |
| R24 = 48.387 | D24 = 1.80 | N14 = 1.76182 | ν14 = 26.5 |
| R25 = 39.391 | D25 = 3.50 | | |
| R26 = 263.616 | D26 = 2.80 | N15 = 1.69680 | ν15 = 55.5 |
| R27 = −73.712 | D27 = 0.10 | | |
| R28 = 79.107 | D28 = 4.80 | N16 = 1.71300 | ν16 = 53.8 |
| R29 = −103.977 | D29 = 1.40 | N17 = 1.84666 | ν17 = 23.8 |
| R30 = −302.891 | | | |

| Variable | Focal Length | | |
|---|---|---|---|
| Separation | 28.8 | 52.13 | 77.43 |
| D 8 | 46.71 | 14.46 | 2.24 |
| D14 | 1.8 | 11.8 | 21.8 |
| D20 | 10.5 | 6.06 | 1.62 |

R11: Aspheric Surface

| | |
|---|---|
| A = 0 | B = −3.75089 × 10⁻⁷ |
| C = 2.89669 × 10⁻¹⁰ | D = 6.62424 × 10⁻¹³ |

Numerical Example 7:

(FIGS. 7, 16(A), 16(B) and 16(C))

| F = 28.8–77.4 | FNO = 1:2.8 | 2ω = 73.8°–31.2° | |
|---|---|---|---|
| R 1 = 112.318 (Aspheric) | D 1 = 2.20 | N 1 = 1.83481 | ν 1 = 42.7 |
| R 2 = 43.560 | D 2 = 16.00 | | |
| R 3 = −1512.328 | D 3 = 2.00 | N 2 = 1.83481 | ν 2 = 42.7 |
| R 4 = 35.617 | D 4 = 5.00 | N 3 = 1.84666 | ν 3 = 23.8 |
| R 5 = 88.280 | D 5 = 1.50 | | |
| R 6 = 53.563 | D 6 = 2.50 | N 4 = 1.84666 | ν 4 = 23.8 |
| R 7 = 60.304 | D 7 = Variable | | |
| R 8 = 79.550 | D 8 = 1.50 | N 5 = 1.84666 | ν 5 = 23.8 |
| R 9 = 39.269 | D 9 = 7.50 | N 6 = 1.71300 | ν 6 = 53.8 |
| R10 = −88.346 | D10 = 0.10 | | |
| R11 = 41.335 | D11 = 7.00 | N 7 = 1.77250 | ν 7 = 49.6 |
| R12 = −147.232 | D12 = 1.50 | N 8 = 1.84666 | ν 8 = 23.8 |
| R13 = 188.635 (Aspheric) | D13 = Variable | | |
| R14 = (Stop) | D14 = 1.00 | | |
| R15 = 662.981 | D15 = 4.10 | N 9 = 1.84666 | ν 9 = 23.8 |
| R16 = −26.757 | D16 = 1.10 | N10 = 1.77250 | ν10 = 49.6 |
| R17 = 55.441 | D17 = 2.80 | | |
| R18 = −33.069 | D18 = 1.10 | N11 = 1.83481 | ν11 = 42.7 |
| R19 = −7905.451 | D19 = Variable | | |
| R20 = −83.147 | D20 = 1.20 | N12 = 1.84666 | ν12 = 23.8 |
| R21 = 883.745 | D21 = 3.50 | N13 = 1.71300 | ν13 = 53.8 |
| R22 = −36.241 | D22 = 0.10 | | |
| R23 = 45.804 | D23 = 1.80 | N14 = 1.76182 | ν14 = 26.5 |
| R24 = 37.229 | D24 = 3.50 | | |
| R25 = −182.280 | D25 = 2.50 | N15 = 1.69680 | ν15 = 55.5 |
| R26 = −57.812 | D26 = 0.10 | | |
| R27 = 87.431 | D27 = 5.00 | N16 = 1.71300 | ν16 = 53.8 |
| R28 = −56.322 | D28 = 1.40 | N17 = 1.84666 | ν17 = 23.8 |
| R29 = −149.333 | | | |

| Variable | Focal Length | | |
|---|---|---|---|
| Separation | 28.8 | 51.81 | 77.4 |
| D 7 | 44.55 | 13.81 | 1.79 |
| D13 | 1.78 | 11.78 | 21.78 |
| D19 | 10.59 | 6.14 | 1.7 |

R1: Aspheric Surface
The Values of the Aspheric Coefficients:

| | |
|---|---|
| A = 0 | B = 5.78991 × 10⁻⁷ |
| C = −4.62210 × 10⁻¹¹ | D = 1.60066 × 10⁻¹⁴ |

R13: Aspheric Surface
The Values of the Aspheric Coefficients:

| | |
|---|---|
| A = 0 | B = 3.56175 × 10⁻⁷ |
| C = −1.61754 × 10⁻¹¹ | D = 1.481666 × 10⁻¹³ |

Numerical Example 8:

(FIGS. 8, 17(A), 17(B) and 17(C))

| F = 28.8–77.46 | FNO = 1:2.8 | 2ω = 73.8°–31.2° | |
|---|---|---|---|
| R 1 = 75.223 (Aspheric) | D 1 = 2.20 | N 1 = 1.83481 | ν 1 = 42.7 |
| R 2 = 37.278 | D 2 = 16.00 | | |
| R 3 = −1600.958 | D 3 = 2.00 | N 2 = 1.83481 | ν 2 = 42.7 |
| R 4 = 32.493 | D 4 = 5.50 | N 3 = 1.84666 | ν 3 = 23.8 |
| R 5 = 71.677 | D 5 = 1.50 | | |
| R 6 = 50.112 | D 6 = 3.00 | N 4 = 1.84666 | ν 4 = 23.8 |
| R 7 = 61.032 | D 7 = Variable | | |
| R 8 = 74.083 | D 8 = 1.50 | N 5 = 1.84666 | ν 5 = 23.8 |
| R 9 = 32.486 | D 9 = 7.50 | N 6 = 1.71300 | ν 6 = 53.8 |
| R10 = −289.769 | D10 = 0.10 | | |
| R11 = 76.844 | D11 = 5.50 | N 7 = 1.77250 | ν 7 = 49.6 |
| R12 = −151.673 | D12 = 1.40 | N 8 = 1.84666 | ν 8 = 23.8 |
| R13 = 340.344 | D13 = 0.10 | | |
| R14 = 54.698 | D14 = 4.50 | N 9 = 1.77250 | ν 9 = 49.6 |
| R15 = 1076.398 | D15 = Variable | | |
| R16 = (Stop) | D16 = 1.00 | | |
| R17 = 179.919 | D17 = 4.10 | N10 = 1.84666 | ν10 = 23.8 |
| R18 = −29.320 | D18 = 1.10 | N11 = 1.77250 | ν11 = 49.6 |
| R19 = 55.441 | D19 = 2.90 | | |
| R20 = −32.601 | D20 = 1.10 | N12 = 1.83481 | ν12 = 42.7 |
| R21 = 199.184 | D21 = Variabale | | |
| R22 = −146.326 | D22 = 1.40 | N13 = 1.84666 | ν13 = 23.8 |
| R23 = −238.520 | D23 = 3.80 | N14 = 1.71300 | ν14 = 53.8 |
| R24 = −31.546 | D24 = 0.10 | | |
| R25 = −92.279 | D25 = 2.80 | N15 = 1.69680 | ν15 = 55.5 |
| R26 = −56.757 | D26 = 0.10 | | |
| R27 = 125.405 (Aspheric) | D27 = 5.00 | N16 = 1.71300 | ν16 = 53.8 |
| R28 = −38.566 | D28 = 1.40 | N17 = 1.84666 | ν17 = 23.8 |
| R29 = −373.726 | | | |

| Variable | Focal Length | | |
|---|---|---|---|
| Separation | 28.8 | 51.51 | 77.46 |
| D 7 | 42.41 | 13.39 | 1.74 |
| D15 | 1.78 | 11.78 | 21.78 |
| D21 | 10.68 | 6.23 | 1.79 |

R1: Aspheric Surface
The Values of the Aspheric Coefficients:

| | |
|---|---|
| A = 0 | B = 3.78122 × 10⁻⁷ |
| C = 2.31162 × 10⁻¹⁰ | D = −7.07093 × 10⁻¹⁴ |

R27: Aspheric Surface
The Values of the Aspheric Coefficients

| | |
|---|---|
| A = 0 | B = −1.9333 × 10⁻⁶ |
| C = −4.86862 × 10⁻⁹ | D = 3.0832 × 10⁻¹² |

Numerical Example 9:

(FIGS. 9, 18(A), 18(B) and 18(C))

| F = 28.8–77.35 | FNO = 1:2.8 | 2ω = 73.8°–31.2° | |
|---|---|---|---|
| R 1 = 82.212 (Aspheric) | D 1 = 2.20 | N 1 = 1.83481 | ν 1 = 42.7 |
| R 2 = 40.145 | D 2 = 16.00 | | |
| R 3 = −734.079 | D 3 = 2.00 | N 2 = 1.83481 | ν 2 = 42.7 |
| R 4 = 32.424 | D 4 = 5.50 | N 3 = 1.84666 | ν 3 = 23.8 |
| R 5 = 65.788 | D 5 = 1.50 | | |
| R 6 = 49.287 | D 6 = 3.00 | N 4 = 1.84666 | ν 4 = 23.8 |

-continued

| F = 28.8–77.35 | | FNO = 1:2.8 | 2ω = 73.8°–31.2° |
|---|---|---|---|
| R 7 = 61.693 | D 7 = Variable | | |
| R 8 = 77.960 | D 8 = 1.50 | N 5 = 1.84666 | ν 5 = 23.8 |
| R 9 = 31.802 | D 9 = 7.50 | N 6 = 1.71300 | ν 6 = 53.8 |
| R10 = –198.781 | D10 = 0.10 | | |
| R11 = 77.219 | D11 = 5.50 | N 7 = 1.77250 | ν 7 = 49.6 |
| R12 = –168.989 | D12 = 1.40 | N 8 = 1.84666 | ν 8 = 23.8 |
| R13 = 357.536 | D13 = 0.10 | | |
| R14 = 50.032 | D14 = 4.50 | N 9 = 1.77250 | ν 9 = 49.6 |
| R15 = 1036.923 | D15 = Variable | | |
| R16 = (Stop) | D16 = 1.00 | | |
| R17 = 159.183 | D17 = 4.10 | N10 = 1.84666 | ν10 = 23.8 |
| R18 = –28.287 | D18 = 1.10 | N11 = 1.77250 | ν11 = 49.6 |
| R19 = 53.088 | D19 = 2.90 | | |
| R20 = –34.394 | D20 = 1.10 | N12 = 1.83481 | ν12 = 42.7 |
| R21 = 122.601 | D21 = Variable | | |
| R22 = –152.863 | D22 = 1.40 | N13 = 1.84666 | ν13 = 23.8 |
| R23 = –275.361 | D23 = 3.80 | N14 = 1.71300 | ν14 = 53.8 |
| R24 = –31.874 | D24 = 0.10 | | |
| R25 = –92.992 | D25 = 2.80 | N15 = 1.69680 | ν15 = 55.5 |
| R26 = –57.447 | D26 = 0.10 | | |
| R27 = 126.107 | D27 = 5.00 | N16 = 1.71300 | ν16 = 53.8 |
| R28 = –38.422 | D28 = 1.40 | N17 = 1.84666 | ν17 = 23.8 |
| R29 = –550.494 (Aspheric) | | | |

| Variable Separation | Focal Length | | |
|---|---|---|---|
| | 28.8 | 51.47 | 77.35 |
| D 7 | 42.81 | 13.44 | 1.65 |
| D15 | 1.95 | 10.8 | 19.65 |
| D21 | 11.11 | 6.26 | 1.41 |

R1: Aspheric Surface
The Values of the Aspheric Coefficients:

| A = 0 | B = 1.90348 × $10^{-7}$ |
|---|---|
| C = 2.99605 × $10^{-10}$ | D = –1.28883 × $10^{-13}$ |

R29: Aspheric Surface
The Values of the Aspheric Coefficients:

| A = 0 | B = 1.86774 × $10^{-6}$ |
|---|---|
| C = 6.79916 × $10^{-9}$ | D = –7.60901 × $10^{-12}$ |

According to the above-described numerical examples, the design rules for the refractive powers of the four lens units and the relation in which the lens units move with zooming are set forth as described before. By these rules, the total length of the complete lens is shortened and the mounting mechanism for the lens is simplified in structure. Despite these advantages, it becomes possible to provide a zoom lens of relatively wide angle of field of view and nonetheless high range of variation of the focal length, while still maintaining high optical performance throughout the entire extended zooming range.

Next, other embodiments are described where improvements are made in the zoom lenses of the numerical examples described above. Particularly, a feature of the following embodiments is that the above-described first lens unit is divided into two lens units of negative refractive powers and, during zooming, these two lens units are made to move in differential relation.

Figure 19:
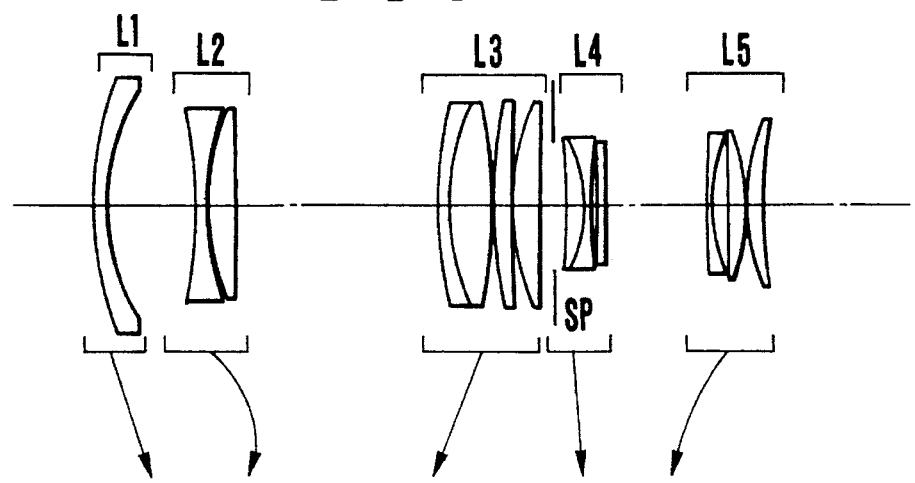
FIG. 19 is a longitudinal section view of a numerical example 10 of a zoom lens of the invention.
Figure 20:
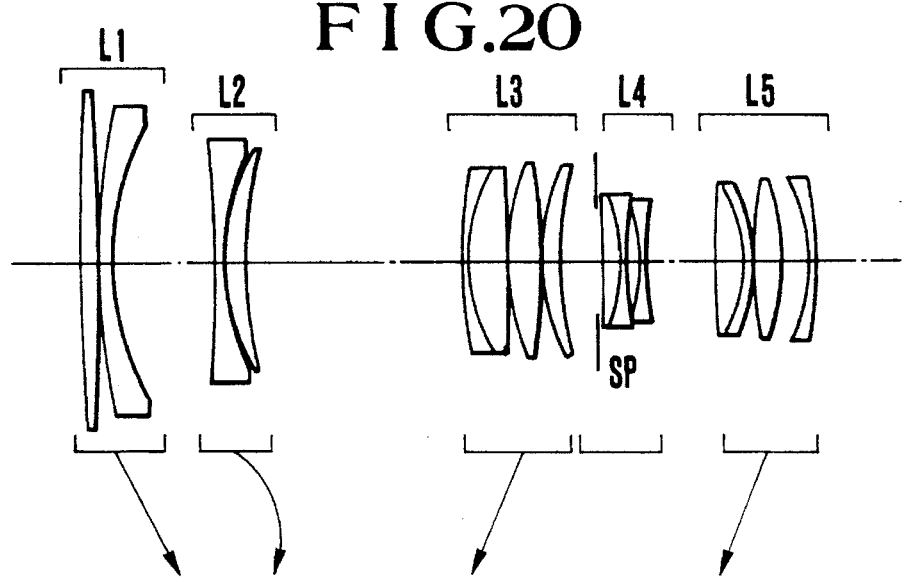
FIG. 20 is a longitudinal section view of a numerical example 11 of a zoom lens of the invention.
Figure 21:
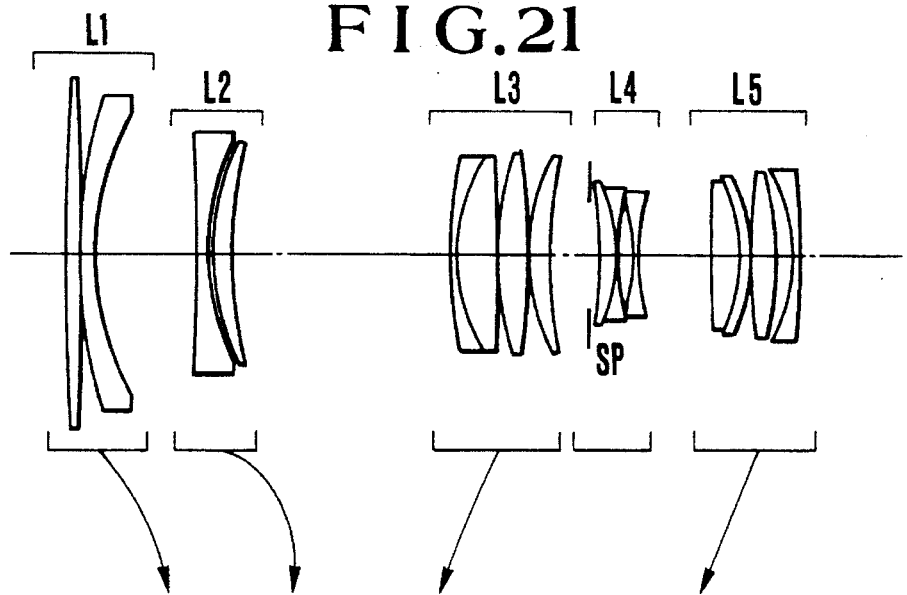
FIG. 21 is a longitudinal section view of a numerical example 12 of a zoom lens of the invention.
Figure 22A:
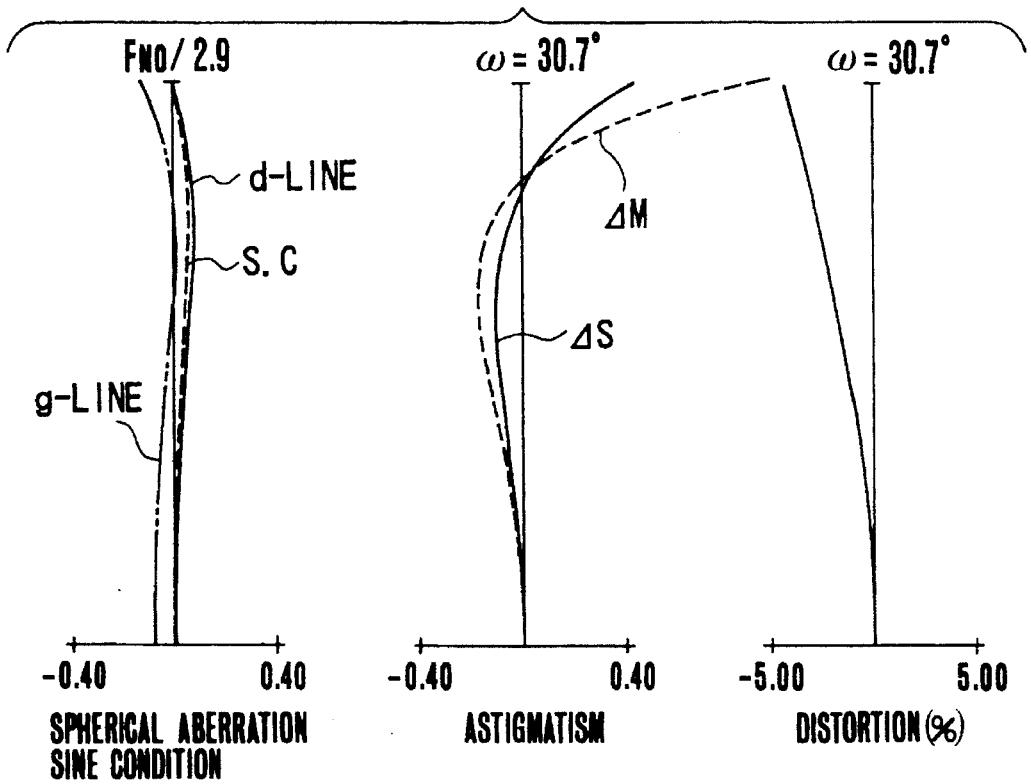
FIGS. 22(A), 22(B) and 22(C) are graphic representations of the various aberrations of the numerical example 10 of the invention in the wide-angle end, an intermediate position and the telephoto end, respectively.
Figure 22B:
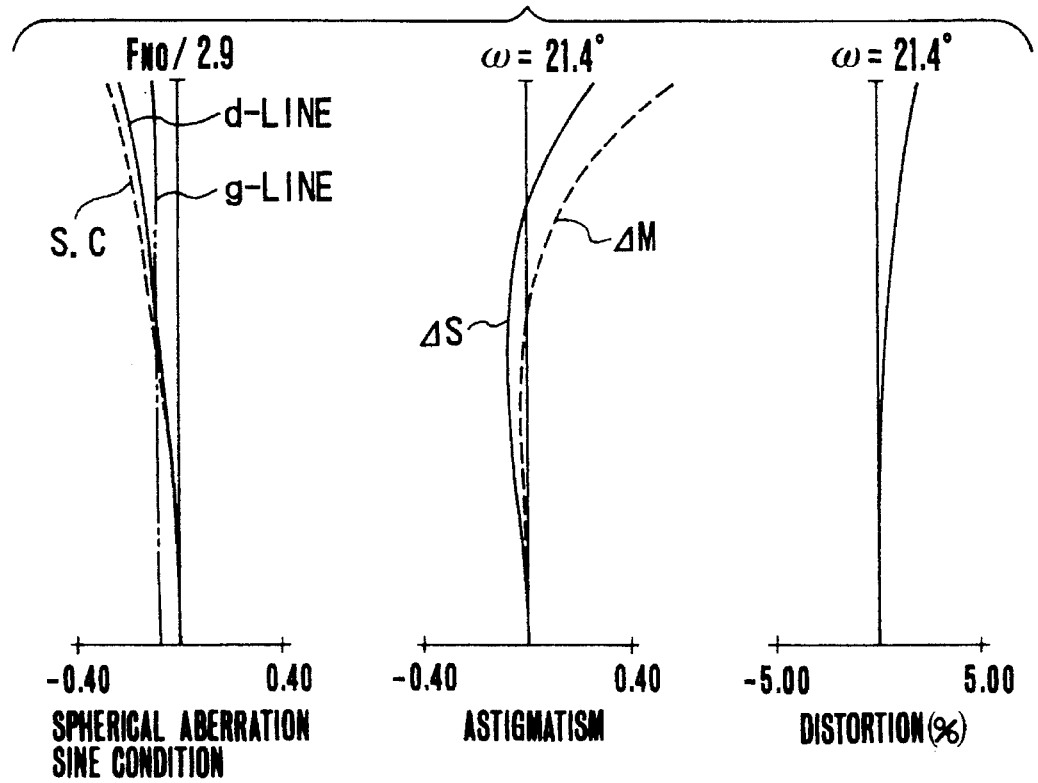
Figure 22C:
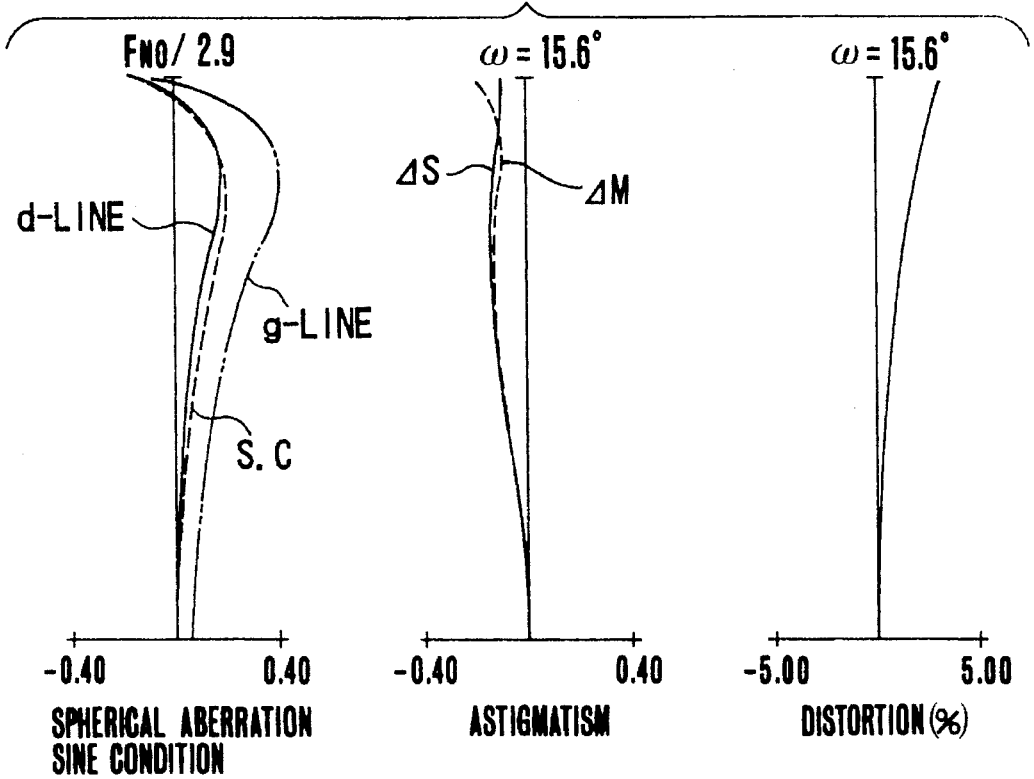
Figure 23A:
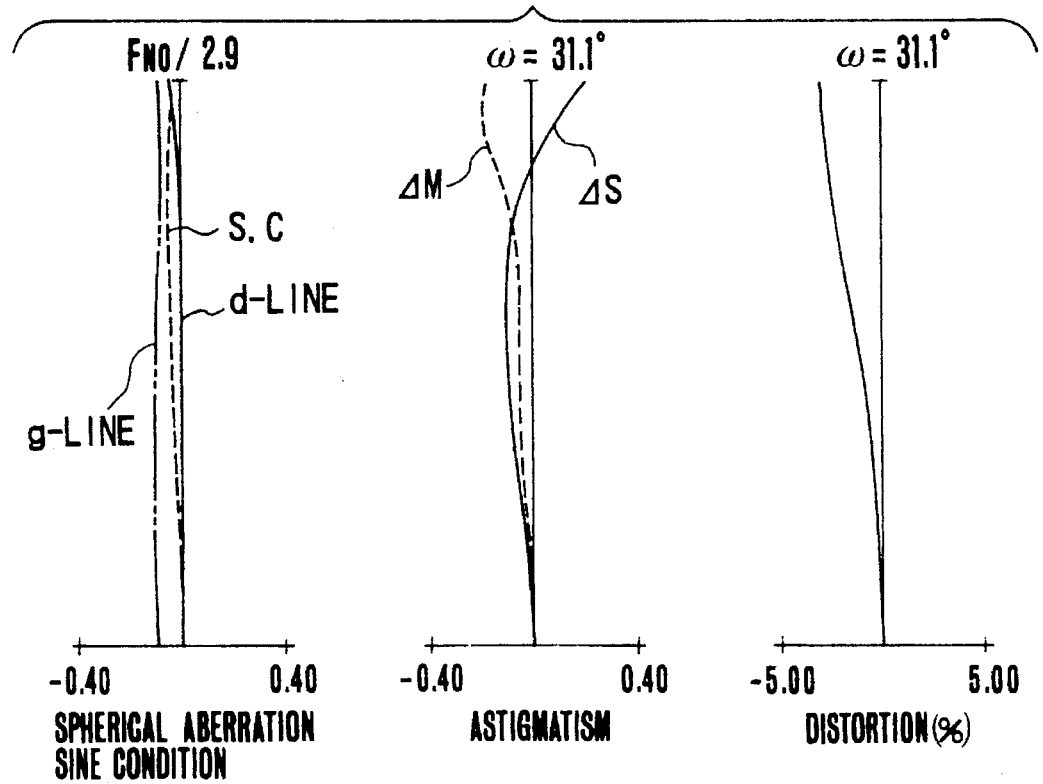
FIGS. 23(A), 23(B) and 23(C) are graphic representations of the various aberrations of the numerical example 11 of the invention in the wide-angle end, an intermediate position and the telephoto end, respectively.
Figure 23B:
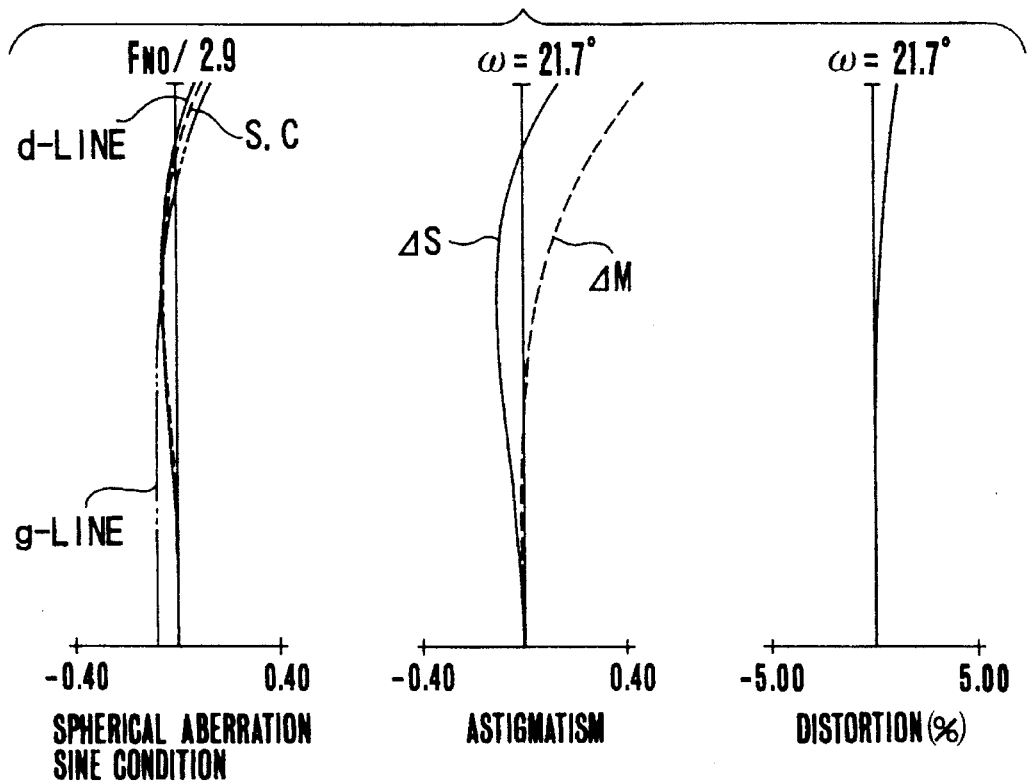
Figure 23C:
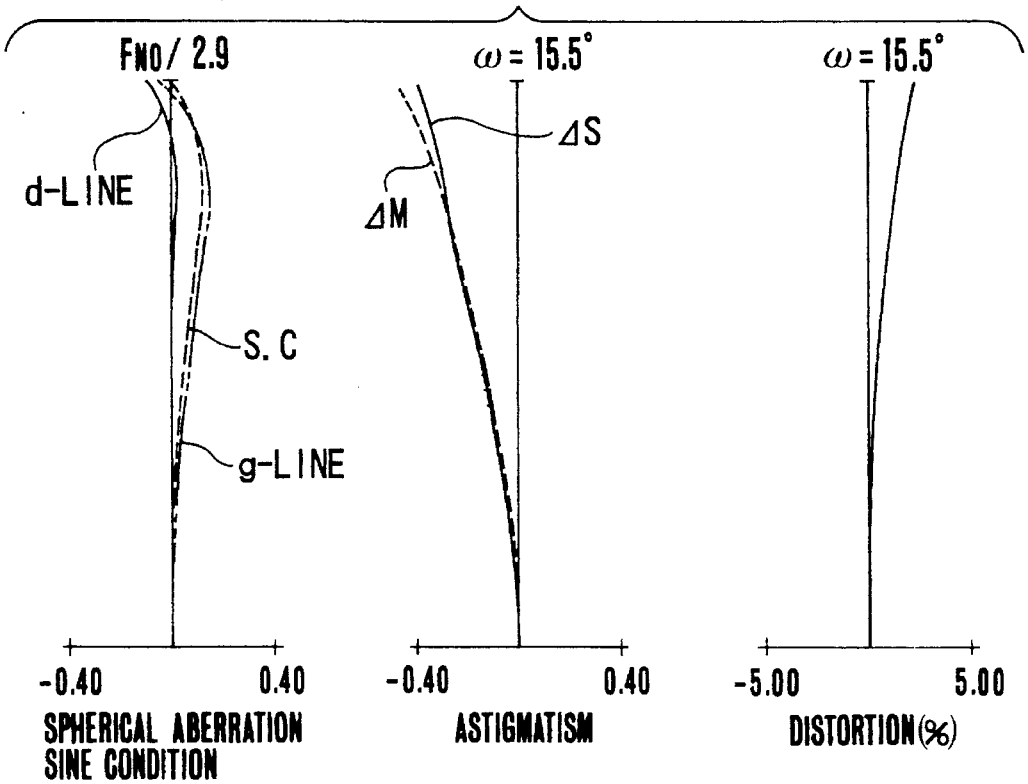
Figure 24A:
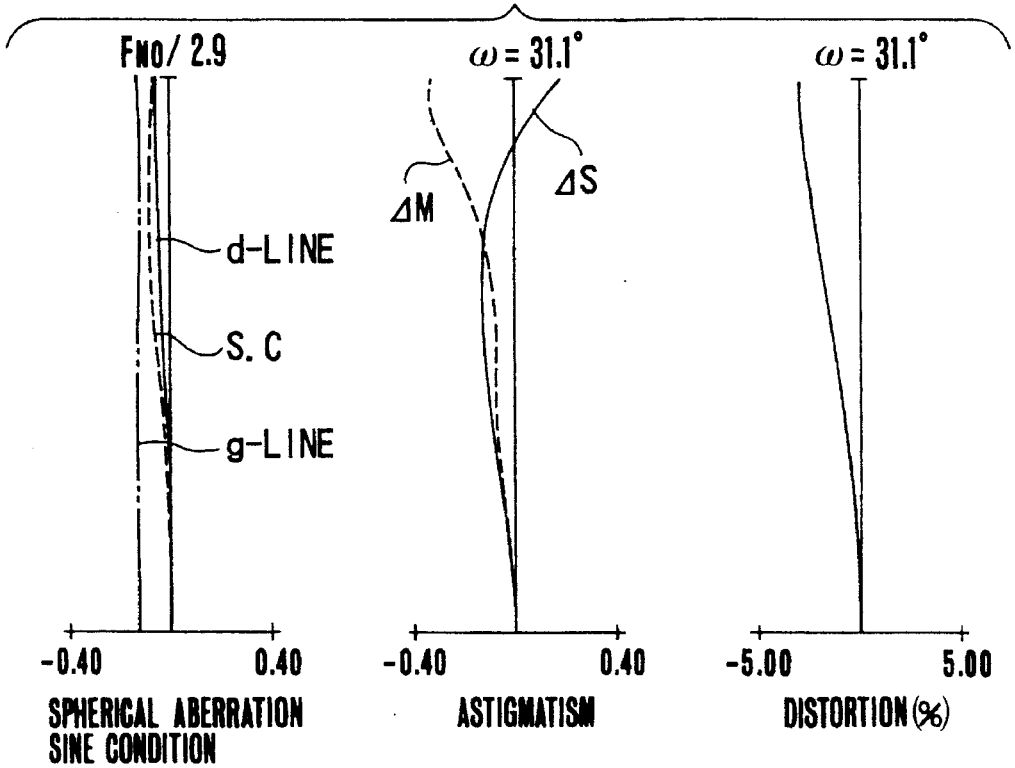
Figure 24B:
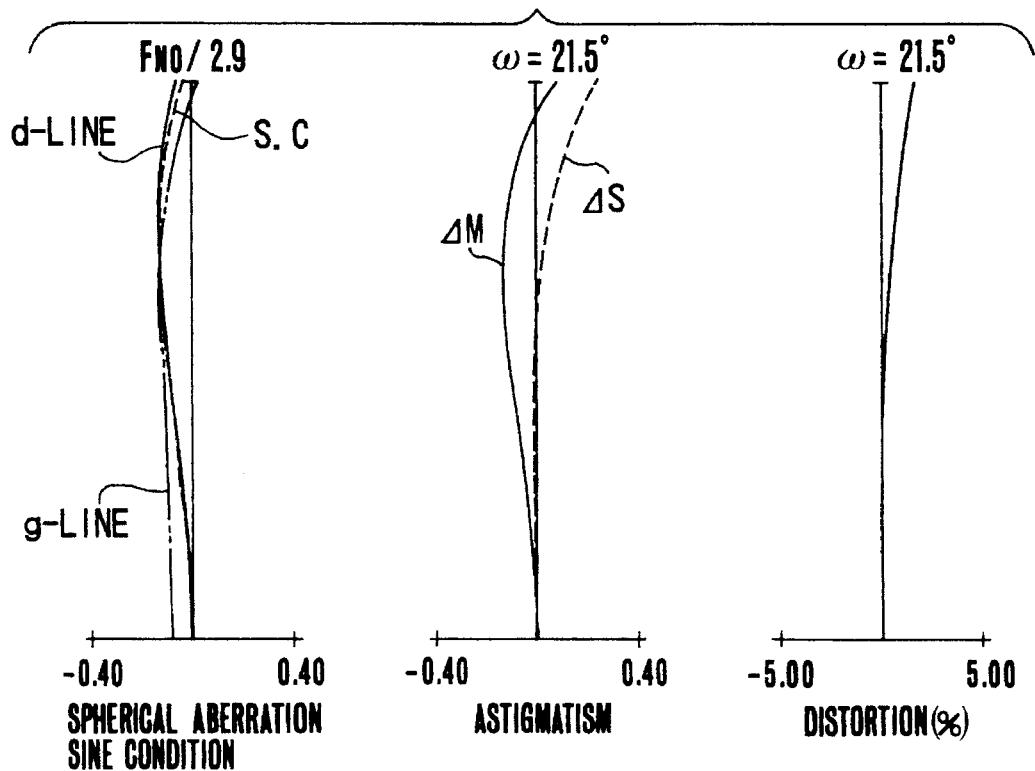

FIG. 19 to FIG. 21 are longitudinal section views of numerical examples 10 to 12 of zoom lenses of the invention in the wide-angle end.

In these figures, L1 denotes a first lens unit of negative refractive power, L2 a second lens unit of negative refractive power, L3 a third lens unit of positive refractive power, L4 a fourth lens unit of negative refractive power, and L5 a fifth lens unit of positive refractive power. SP stands for the stop. Arrows indicate the loci of movement of all the lens units for zooming from the wide-angle end to the telephoto end.

In the present embodiment, as shown in the drawings, when zooming from the wide-angle end to the telephoto end, certain ones of the lens units are moved in such a way that the separation between the second and third lens units decreases, the separation between the third and fourth lens units increases, and the separation between the fourth and fifth lens units decreases, and at the same time, the first and second lens units are moved in respective different loci from each other.

Of these, the numerical example 10 of FIG. 19 has its five lens units all made to move. In the numerical examples 11 and 12 of FIGS. 20 and 21, the first, second, third and fifth lens units are made movable, while the fourth lens unit is made stationary. Again, in each of the examples of FIGS. 19 to 21, focusing is performed by moving the second lens unit.

The zoom lens of the invention has a feature that, in the wide-angle end, for the first and second lens units both of negative refractive powers, the third lens unit of positive refractive power is arranged in axially far spaced relation thereto, also for the third lens unit, the fourth lens unit of negative refractive power is arranged in close relation thereto, and further for the fourth lens unit, the fifth lens unit of positive refractive power is arranged in far spaced relation thereto. This affords the entire lens system to take the form of the retro type. Thus, the maximum angle of field of view is increased, while still permitting a predetermined back focal distance to be obtained with ease.

Another feature is that, for zooming from the wide-angle end to the telephoto end, certain ones of the lens units are moved in such relation that, in the telephoto end, the third lens unit of positive refractive power approaches the first and second lens units both of negative refractive powers, the separation between the third lens unit and the fourth lens unit of negative refractive power widens, and the fifth lens unit of positive refractive power approaches the fourth lens unit, so that the entire lens system becomes the form of the telephoto type.

All the lens units thus effectively share the variation of the focal length with an advantage of reducing the total zooming movement of every lens unit. This leads to simultaneous fulfillment of the requirements of getting a predetermined zoom ratio and of minimizing the bulk and size of the entire lens system.

In the numerical example 10 of FIG. 19, when zooming from the wide-angle end to the telephoto end, the first and fourth lens units move linearly toward the image side, the third lens unit moves linearly toward the object side, the fifth lens unit moves while depicting a locus convex toward the object side, and the second lens unit moves while depicting a locus convex toward the image side. It should be noted that in the numerical examples 11 and 12 of FIGS. 20 and 21, the fourth lens unit remains stationary, the fifth lens unit moves linearly toward the object side, and the other lens units move as depicted in the respective figures.

In the present invention, such a locus of movement for the first lens unit is so designed that the first lens unit does not rapidly change its moving speed as zooming goes constantly, or does not change its direction midway through the total zooming movement. This provides a possibility of making up a lens mounting which is very stable against, for example, shock given to the camera along the optical axis.

Particularly, the linear locus is employed in moving the first lens unit. Thus, the stability against the shock on the camera is strengthened. In addition, on the point of view of the operating mechanism, the necessity of the elaborate control cam for the first lens unit is obviated. Thus, a simplified structure suffices for the lens mounting mechanism. Also, focusing is performed by axially moving the second lens unit which is relatively light in weight, that is, the inner focus type is employed. In application to, for example, the auto-focus camera, the focusing operation is easy to perform. Thus, fast focusing is made possible.

Further, the use of such an inner focus type provides another possibility of constructing the operating mechanism in the form of not rotating the first lens unit about its own axis during zooming and focusing and facilitates simplification of the construction and arrangement of the parts of the mechanism.

In the zoom lens of the invention, the first lens unit is constructed from a negative lens of meniscus shape having a concave surface of strong refractive power facing the image side. This permits the off-axial light beam to refract gradually as it travels. In the wide-angle end, therefore, it is made easy for the entirety of the lens system to take the form of the retro type. Thus, the negative distortion which, when increasing the maximum angle of field of view, would be otherwise produced on the wide-angle side, is corrected well.

To simultaneously fulfill the requirements of shortening the total length of the complete lens and widening the maximum angle of field of view and of maintaining good stability of aberrations throughout the entire zooming range to obtain a high optical performance, it is preferable in the invention to satisfy the following conditions:

The second lens unit includes a negative first lens having a concave surface facing the image side and a positive second lens having a convex surface facing the object side, wherein, letting the radius of curvature of the rear surface of the first lens be denoted by R2a, the radius of curvature of the front surface of the second lens by R2b, the focal length of the i-th lens unit by fi, the overall focal length of the first and second lens units in the wide-angle end by f1,2 and the focal length of the entire lens system in the telephoto end by fT, $$0.35<|f1,2|/fT<0.9 \quad (1)$$

$$0.75<f1/f2<3.0 \quad (2)$$

$$0.7<R2a/R2b<1.2 \quad (3)$$

are satisfied.

The inequalities of condition (1) give a proper range for the overall refractive power of the first and second lens units in the wide-angle end and have an aim chiefly to minimize the outer diameters of these lens units, while still permitting various aberrations to be corrected in good balance.

When the overall refractive power is too weak as exceeding the upper limit of the condition (1), the function of refracting the off-axis light beam on the wide-angle side becomes weak. To admit a predetermined amount of the off-axial light beam, the outer diameters of the first and second lens units must be increased largely. When the overall refractive power of the first and second lens units is too strong and exceeds the lower limit, the off-axial aberrations such as distortion and astigmatism that the first and second lens unit produce become large, although the outer diameters of the first and second lens units get smaller. So, it becomes difficult to correct these aberrations by using any other lens units.

The inequalities of condition (2) make the the ratio of the refractive powers of the first and second lens units to take an appropriate value within the framework of the condition (1) and have an aim chiefly to shorten the total length of the complete lens, while still minimizing the range of variation of aberrations with focusing by the second lens unit.

When the refractive power of the second lens unit is too strong and exceeds the upper limit of the condition (2), the required total focusing movement for the second lens unit becomes small. Though this is advantageous for shortening the total length of the complete lens, the range of variation of aberrations with focusing is caused to increase. Therefore, it becomes difficult to maintain good stability of optical performance throughout the entire range of object distances. When the refractive power of the second lens unit is too weak and exceeds the lower limit, the total focusing movement increases largely, causing the complete lens to take a long total length and also causing the distance from the first lens unit to the stop to get longer. To admit of the off-axial light beam, the outer diameter of the first lens unit must be increased largely. So, it is not desirable.

The inequalities of condition (3) give a proper range for the ratio of the radii of curvature Ra and Rb of the rear and front surfaces of the negative first and positive second lenses constituting part of the second lens unit and have an aim chiefly to well correct the spherical aberration produced in the first lens unit.

When the radius of curvature R2a is too large compared with the radius of curvature R2b as exceeding the upper limit of the condition (3), good correction of the spherical aberration is insured, but the negative refractive power of the whole second lens unit is weakened. If other lens surfaces bear this, the amount of coma and other aberrations produced from these lens surfaces comes to be large.

When the radius of curvature R2a is too small compared with the radius of curvature R2b and exceeds the lower limit, the amount of positive spherical aberration produced increases largely. It becomes difficult to correct this by using any lens surface, for example, the front surface of the second lens.

Still another feature of the invention is that the requirements of securing a predetermined zoom ratio and of correcting all aberrations in good balance throughout the entire zooming range are fulfilled at once. To this end, the aforesaid third lens unit includes at least one negative lens and at least two positive lenses, satisfying the following condition:

$$0.28<f3/fT<0.85 \quad (4)$$

where f3 is the focal length of the third lens unit and fT is the longest focal length of the entire lens system.

The inequalities of condition (4) are concerned with the ratio of the focal length of the third lens unit to the focal length in the telephoto end of the entire lens system.

When the refractive power of the third lens unit is too weak and exceeds the upper limit of the condition (4), the required total zooming movements of the lens units for attaining the predetermined value of the zoom ratio increase to increase not only the total length but also the outer diameter of the complete lens. So, it is not desirable. When the refractive power of the third lens unit is too strong and exceeds the lower limit, the whole lens system decreases in size but the spherical aberration and other aberrations the third lens unit produces are increased, which become difficult to correct by using the other lens unit.

In the invention, with the condition (4) satisfied, when the third lens unit is constructed from at least one negative lens and at least two positive lenses, chromatic aberrations are corrected effectively and the amount of spherical aberration produced is reduced.

Next, numerical examples 10 to 12 of the invention are shown. In the tables of the numerical data for the examples 10 to 12, Ri is the radius of curvature of the i-th lens surface, when counted from the object side, Di is the i-th lens thickness or air separation from the object side, and Ni and υi are respectively the refractive index and Abbe number of the glass of the i-th lens element, when counted from the object side.

The shape of an aspheric surface is expressed in the coordinates with an X axis in the axial direction and an H axis in the perpendicular direction to the optical axis, the direction in which light advances being taken as positive, by the following equation:

$$X = \frac{(1/R) H^2}{1 + \sqrt{1 - (H/R)^2}} + AH^2 + BH^4 + CH^6 + DH^8 + EH^{10}$$

where R is the radius of the osculating sphere and A, B, C, D and E are the aspheric coefficients.

The relationship between the above-described conditions (1) to (4) and the values of their factors for the numerical examples 10 to 12 is also shown in Table.

Numerical Example 10:

(FIGS. 19, 22(A), 22(B) and 22(C))

| F = 36.5–77.4 | FNO = 1:2.9 | 2ω = 62.2°–31.1° | |
|---|---|---|---|
| R 1 = 69.33 (Aspheric) | D 1 = 2.20 | N 1 = 1.77250 | ν 1 = 49.6 |
| R 2 = 38.49 | D 2 = Variable | | |
| R 3 = −79.11 | D 3 = 1.80 | N 2 = 1.88300 | ν 2 = 40.8 |
| R 4 = 54.47 | D 4 = 0.50 | | |
| R 5 = 56.11 | D 5 = 4.50 | N 3 = 1.84666 | ν 3 = 23.8 |
| R 6 = 5045.30 | D 6 = Variable | | |
| R 7 = 89.26 | D 7 = 1.50 | N 4 = 1.84666 | ν 4 = 23.8 |
| R 8 = 37.81 | D 8 = 8.00 | N 5 = 1.65160 | ν 5 = 58.5 |
| R 9 = −103.33 | D 9 = 0.15 | | |
| R10 = 74.97 | D10 = 4.00 | N 6 = 1.69680 | ν 6 = 55.5 |
| R11 = 1307.60 | D11 = 0.15 | | |
| R12 = 51.67 | D12 = 5.00 | N 7 = 1.69680 | ν 7 = 55.5 |
| R13 = 3317.12 | D13 = Variable | | |
| R14 = (Stop) | D14 = 2.00 | | |
| R15 = −93.73 | D15 = 3.30 | N 8 = 1.80518 | ν 8 = 25.4 |
| R16 = −31.23 | D16 = 1.30 | N 9 = 1.63930 | ν 9 = 44.9 |
| R17 = 77.19 | D17 = 1.40 | | |
| R18 = −162.57 | D18 = 1.30 | N10 = 1.60323 | ν10 = 42.3 |
| R19 = −7621.93 | D19 = Variable | | |
| R20 = 245.95 | D20 = 1.30 | N11 = 1.84666 | ν11 = 23.8 |
| R21 = 35.85 | D21 = 2.70 | | |
| R22 = 871.81 | D22 = 3.00 | N12 = 1.69680 | ν12 = 55.5 |
| R23 = −46.11 | D23 = 0.15 | | |
| R24 = 41.75 | D24 = 2.80 | N13 = 1.77250 | ν13 = 49.6 |
| R25 = 81.22 | | | |

The values of the Aspheric Coefficients:

B = 2.01734 × 10⁻⁷    C = 1.45657 × 10⁻¹⁰
D = 6.76429 × 10⁻¹⁴   E = −3.01424 × 10⁻¹⁶

| Variable | Focal Length | |
|---|---|---|
| Separation | 36.52 | 77.42 |
| D 2 | 16.43 | 15.33 |
| D 6 | 37.63 | 0.99 |
| D13 | 2.64 | 19.64 |
| D19 | 18.93 | 1.93 |

Numerical Example 11:

(FIGS. 20, 23(A), 23(B) and 23(C))

| F = 35.9–77.8 | FNO = 1:2.9 | 2ω 62.2°–31.1° | |
|---|---|---|---|
| R 1 = 684.66 | D 1 = 2.62 | N 1 = 1.80518 | ν 1 = 25.4 |
| R 2 = −1055.76 | D 2 = 0.20 | | |
| R 3 = 149.76 | D 3 = 2.10 | N 2 = 1.71300 | ν 2 = 53.8 |
| R 4 = 53.30 | D 4 = Variable | | |
| R 5 = −488.25 | D 5 = 2.00 | N 3 = 1.77250 | ν 3 = 49.6 |
| R 6 = 44.81 | D 6 = 0.53 | | |
| R 7 = 43.27 | D 7 = 3.50 | N 4 = 1.84666 | ν 4 = 23.9 |
| R 8 = 78.34 | D 8 = Variable | | |
| R 9 = 84.43 | D 9 = 1.20 | N 5 = 1.84666 | ν 5 = 23.8 |
| R10 = 30.98 | D10 = 7.20 | N 6 = 1.55963 | ν 6 = 61.2 |
| R11 = −1529.08 | D11 = 0.15 | | |
| R12 = 50.67 | D12 = 6.00 | N 7 = 1.65160 | ν 7 = 58.5 |
| R13 = −110.42 | D13 = 0.15 | | |
| R14 = 40.57 | D14 = 3.30 | N 8 = 1.65160 | ν 8 = 58.5 |
| R15 = 71.98 | D15 = Variable | | |
| R16 = (Stop) | D16 = 1.50 | | |
| R17 = −145.10 | D17 = 3.00 | N 9 = 1.84666 | ν 9 = 23.8 |
| R18 = −34.13 | D18 = 1.20 | N10 = 1.60311 | ν10 = 60.7 |
| R19 = 112.83 | D19 = 2.00 | | |
| R20 = −42.83 | D20 = 1.40 | N11 = 1.60311 | ν11 = 60.7 |
| R21 = 66.44 | D21 = Variable | | |
| R22 = 347.07 | D22 = 5.00 | N12 = 1.55963 | ν12 = 61.2 |
| R23 = −26.27 | D23 = 1.50 | N13 = 1.80518 | ν13 = 25.4 |
| R24 = −35.22 | D24 = 0.15 | | |
| R25 = 104.39 | D25 = 5.00 | N14 = 1.71300 | ν14 = 53.8 |
| R26 = −51.25 | D26 = 5.44 | | |
| R27 = −30.94 | D27 = 1.35 | N15 = 1.84666 | ν15 = 23.8 |
| R28 = −84.63 | | | |

| Variable | Focal Length | |
|---|---|---|
| Separation | 35.91 | 77.79 |
| D 4 | 18.02 | 17.94 |
| D 8 | 40.13 | 2.52 |
| D15 | 6.91 | 21.23 |
| D21 | 13.17 | 2.94 |

Numerical Example 12:

(FIGS. 21, 24(A), 24(B) and 24(C))

| F = 35.8–77.6 | FNO = 1:2.9 | 2ω = 62.3°–31.2° | |
|---|---|---|---|
| R 1 = 791.76 | D 1 = 2.62 | N 1 = 1.80518 | ν 1 = 25.4 |
| R 2 = −1937.16 | D 2 = 0.20 | | |

F = 35.8–77.6    FNO = 1:2.9    2ω = 62.3°–31.2°

| | | | |
|---|---|---|---|
| R 3 = 112.86 | D 3 = 2.10 | N 2 = 1.71300 | ν 2 = 53.8 |
| R 4 = 51.40 | D 4 = Variable | | |
| R 5 = −317.21 | D 5 = 2.00 | N 3 = 1.77250 | ν 3 = 49.6 |
| R 6 = 44.52 | D 6 = 0.60 | | |
| R 7 = 43.29 | D 7 = 3.50 | N 4 = 1.84666 | ν 4 = 23.9 |
| R 8 = 75.72 | D 8 = Variable | | |
| R 9 = 78.89 | D 9 = 1.20 | N 5 = 1.84666 | ν 5 = 23.8 |
| R10 = 31.34 | D10 = 7.20 | N 6 = 1.55963 | ν 6 = 61.2 |
| R11 = −78204.10 | D11 = 0.15 | | |
| R12 = 52.30 | D12 = 6.00 | N 7 = 1.65160 | ν 7 = 58.5 |
| R13 = −104.66 | D13 = 0.15 | | |
| R14 = 43.06 | D14 = 3.30 | N 8 = 1.65160 | ν 8 = 58.5 |
| R15 = 95.40 | D15 = Variable | | |
| R16 = (Stop) | D16 = 1.50 | | |
| R17 = −134.01 | D17 = 3.00 | N 9 = 1.84666 | ν 9 = 23.8 |
| R18 = −33.45 | D18 = 1.20 | N10 = 1.60311 | ν10 = 60.7 |
| R19 = 102.01 | D19 = 2.00 | | |
| R20 = −44.08 | D20 = 1.40 | N11 = 1.60311 | ν11 = 60.7 |
| R21 = 63.77 | D21 = Variable | | |
| R22 = 723.38 | D22 = 5.30 | N12 = 1.55963 | ν12 = 61.2 |
| R23 = −26.94 | D23 = 1.50 | N13 = 1.80518 | ν13 = 25.4 |
| R24 = −31.98 | D24 = 0.15 | | |
| R25 = 97.49 | D25 = 5.00 | N14 = 1.71300 | ν14 = 53.8 |
| R26 = −48.30 | D26 = 2.50 | | |
| R27 = −32.10 | D27 = 1.35 | N15 = 1.84666 | ν15 = 23.8 |
| R28 = −125.97 | | | |

| Variable Separation | Focal Length | | |
|---|---|---|---|
| | 35.80 | 54.93 | 77.64 |
| D 4 | 18.26 | 22.67 | 17.75 |
| D 8 | 39.45 | 13.78 | 2.44 |
| D15 | 7.07 | 14.07 | 21.07 |
| D21 | 13.17 | 8.09 | 3.01 |

| Condition | Numerical Example | | |
|---|---|---|---|
| | 10 | 11 | 12 |
| \|f1, 2\|/fT | 0.576 | 0.897 | 0.693 |
| f1/f2 | 1.418 | 1.522 | 1.897 |
| R2a/R2b | 0.971 | 1.036 | 1.028 |
| f3/fT | 0.413 | 0.483 | 0.461 |

According to each of the foregoing embodiments, the refractive powers of the five lens units and the relation in which the lens units move axially to effect zooming are specified as described above. By these features or conditions, it is made possible to realize a zoom lens of shortened total length at a relatively wide maximum angle of field of view and a high zoom ratio with the operating mechanism of simplified structure, while still permitting high optical performance over the entire zooming range.

What is claimed is:

1. A zoom lens comprising at least, from an object side to an image side, first lens unit of negative refractive power, a second lens unit of positive refractive power, a third lens unit of negative refractive power and a fourth lens unit of positive refractive power zooming from a wide-angle end to a telephoto end being performed by moving at least said first, second and fourth lens units in such a way that an air separation between said first and second lens units decreases, an air separation between said second and third lens units increases and an air separation between said third and fourth lens units decreases, said first lens unit consisting of a negative lens having a meniscus shape having a concave surface facing the image side, a negative lens and a positive lens having a meniscus shape having a convex surface facing the object side, said third lens unit having a positive lens and a negative lens and said fourth lens unit consisting of a negative lens and a positive lens, and having an aspheric surface.

2. A zoom lens according to claim 1, wherein said second lens unit includes, from the object side to the image side, a negative lens of meniscus shape having a strong negative refracting surface facing the image side, a positive lens and a positive lens having a convex surface facing the object side.

3. A zoom lens according to claim 1, wherein said third lens unit remains stationary during zooming.

4. A zoom lens according to claim 1, wherein said second and fourth lens units move in unison toward the object side when zooming from the wide-angle end to the telephoto end.

\* \* \* \* \*

UNITED STATES PATENT AND TRADEMARK OFFICE
CERTIFICATE OF CORRECTION

PATENT NO. : 5,576,890  
DATED : November 19, 1996  
INVENTOR(S) : TSUNEFUMI TANAKA, ET AL.

It is certified that error appears in the above-indentified patent and that said Letters Patent is hereby corrected as shown below:

On title page, item

[57] References Cited

Foreign Patent Documents:

"1193709" should read --1-193709--; and  
"2201310" should read --2-201310--.

COLUMN 2

Line 21, change "of-negative" should read --of negative--.

COLUMN 6

Line 27, change "Conversely" should read --Conversely,--.

COLUMN 7

Line 49, change "Conversely" should read --Conversely,--.

COLUMN 10

Line 59, change "D=1.53483x10$^{-1}$" to --D=1.53483x10$^{-10}$--.

UNITED STATES PATENT AND TRADEMARK OFFICE
CERTIFICATE OF CORRECTION

PATENT NO. : 5,576,890
DATED : November 19, 1996
INVENTOR(S) : TSUNEFUMI TANAKA, ET AL.

It is certified that error appears in the above-indentified patent and that said Letters Patent is hereby corrected as shown below:

COLUMN 11

Line 56, "R10=31.279" should read --R10=31.729--; and
    Line 63, "N10=1.5813" should read --N10=1.58313--.

COLUMN 15

Line 52, delete "The values of the Aspheric Coefficients:".

COLUMN 16

Line 43, change "N'18=1.84666" should read --N8=1.84666--.

COLUMN 18

Line 23, "D21=Variabale" should read --D21=Variable--; and
    Line 49, "Coefficients" should read --Coefficients:--.

UNITED STATES PATENT AND TRADEMARK OFFICE
CERTIFICATE OF CORRECTION

PATENT NO. : 5,576,890
DATED : November 19, 1996
INVENTOR(S) : TSUNEFUMI TANAKA, ET AL.

It is certified that error appears in the above-indentified patent and that said Letters Patent is hereby corrected as shown below:

COLUMN 22

Line 6, "the the" should read --the--; and
Line 56, "the-third" should read --the third--.

COLUMN 23

Line 33, "Table." should read --the Table.--.

COLUMN 24

Line 20, "$2\omega$ 62.2°-31.1°" should read --$2\omega=62.2°-31.1°$--.

COLUMN 26

Line 16, "first" should read --a first--.

Signed and Sealed this

Twenty-fourth Day of June, 1997

*Attest:*

BRUCE LEHMAN

*Attesting Officer*      Commissioner of Patents and Trademarks